United States Patent
Cheng et al.

(10) Patent No.: US 12,451,711 B2
(45) Date of Patent: Oct. 21, 2025

(54) BATTERY CHARGING PROCESS PREDICTION METHOD AND APPARATUS

(71) Applicant: SHENZHEN YINWANG INTELLIGENT TECHNOLOGIES CO., LTD., Shenzhen (CN)

(72) Inventors: Kang Cheng, Nanjing (CN); Jiajia Wang, Shenzhen (CN); Zemin Zhu, Nanjing (CN); Fei Zhong, Nanjing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 441 days.

(21) Appl. No.: 17/953,040

(22) Filed: Sep. 26, 2022

(65) Prior Publication Data

US 2023/0021611 A1    Jan. 26, 2023

Related U.S. Application Data

(63) Continuation of application No. PCT/CN2020/082624, filed on Mar. 31, 2020.

(51) Int. Cl.
*H02J 7/00* (2006.01)
*B60L 53/00* (2019.01)
(Continued)

(52) U.S. Cl.
CPC .......... *H02J 7/0048* (2020.01); *B60L 53/00* (2019.02); *B60L 58/10* (2019.02);
(Continued)

(58) Field of Classification Search
CPC .... H02J 7/0048; H02J 7/00032; H02J 7/0047; B60L 53/00; B60L 53/305; B60L 58/10; B60L 58/12; B60L 2250/16
See application file for complete search history.

(56) References Cited

U.S. PATENT DOCUMENTS

| | | | |
|---|---|---|---|
| 5,726,555 | A | 3/1998 | Takamoro |
| 9,431,842 | B1 | 8/2016 | Noble, Jr. et al. |
| 2015/0357837 | A1* | 12/2015 | Takai .................... H01M 10/44 320/137 |

FOREIGN PATENT DOCUMENTS

| | | |
|---|---|---|
| CN | 102315670 A | 1/2012 |
| CN | 102901926 A | 1/2013 |

(Continued)

OTHER PUBLICATIONS

Office Action in Chinese Appln. No. 202080004877.1, dated Aug. 4, 2021, 22 pages (with English translation).
(Continued)

*Primary Examiner* — Zixuan Zhou
(74) *Attorney, Agent, or Firm* — Fish & Richardson P.C.

(57) ABSTRACT

A battery charging progress prediction method and apparatus are provided. One example method includes: receiving a request message from a first terminal or a second terminal, where the request message includes a battery model of a battery of the first terminal and a first state of charge (SOC); determining charging progress information of the battery of the first terminal based on the request message; and sending a response message to the first terminal or the second terminal, where the response message includes the charging progress information.

20 Claims, 10 Drawing Sheets

(51) Int. Cl.
  *B60L 58/10* (2019.01)
  *B60L 53/30* (2019.01)
  *B60L 58/12* (2019.01)

(52) U.S. Cl.
  CPC ........ *H02J 7/00032* (2020.01); *H02J 7/0047* (2013.01); *B60L 53/305* (2019.02); *B60L 58/12* (2019.02); *B60L 2250/16* (2013.01)

(56) References Cited

FOREIGN PATENT DOCUMENTS

| CN | 103337890 A | 10/2013 |
| CN | 103413180 A | 11/2013 |
| CN | 104424396 A | 3/2015 |
| CN | 104995814 A | 10/2015 |
| CN | 106394295 A | 2/2017 |
| CN | 107181298 A | 9/2017 |
| CN | 107768756 A | 3/2018 |
| CN | 108076218 A | 5/2018 |
| CN | 108649635 A | 10/2018 |
| CN | 108736084 A | 11/2018 |
| CN | 108848553 A | 11/2018 |
| CN | 109861333 A | 6/2019 |
| CN | 110022403 A | 7/2019 |
| CN | 110429672 A | 11/2019 |
| CN | 110676905 A | 1/2020 |
| JP | 2011166971 A | 8/2011 |

OTHER PUBLICATIONS

Office Action in Chinese Appln. No. 202080004877.1, dated Oct. 11, 2021, 7 pages (with English translation).
Extended European Search Report in European Appln No. 20928653. 3, dated Mar. 29, 2023, 7 pages.
International Search Report and Written Opinion in International Appln. No. PCT/CN2020/082624, mailed on Dec. 29, 2020, 20 pages (with English translation).

* cited by examiner

BATTERY CHARGING PROCESS PREDICTION METHOD AND APPARATUS

CROSS-REFERENCE TO RELATED APPLICATIONS

This application is a continuation of International Application No. PCT/CN2020/082624, filed on Mar. 31, 2020, the disclosure of which is hereby incorporated by reference in its entirety.

TECHNICAL FIELD

This application relates to the field of battery management, and in particular, to a battery charging progress prediction method and apparatus.

BACKGROUND

In a background of an energy crisis and environmental protection, industries related to electric transportation tools such as an electric vehicle and a hybrid electric vehicle develop rapidly, and a transportation tool powered by a battery (for example, a lithium battery) will become a mainstream transportation tool for people in the future. Compared with a transportation tool powered by fuel, the transportation tool powered by a battery has problems such as few energy supplement stations and long charging duration. Usually, a user needs to make a proper travel plan based on a battery charging progress, for example, whether electric energy supplemented within specified duration can support a forthcoming travel, or whether a battery can be fully charged before specified time. Therefore, the user can make a more proper travel plan when learning a more accurate battery charging progress, which improves user experience.

In some current battery charging progress prediction methods, equivalent circuit modeling may be performed based on a chemical characteristic of a battery, to establish a charge-discharge model of a nonlinear equation, and to describe a charge-discharge process of the battery by using the model. Solving the nonlinear equation can predict charging duration from a state of charge (SOC) to another SOC. However, in one aspect, the method is implemented based on a chemical principle, and it is necessary to be familiar with the chemical principle of the battery and obtain some chemical parameters of the battery, which imposes a high requirement on chemical professional knowledge. In another aspect, solving the nonlinear equation is difficult, which is unfavorable to actual application. Therefore, the battery charging progress prediction method requires harsh implementation conditions, and is therefore unfavorable to actual application. Consequently, a battery charging progress is hard to predict.

SUMMARY

Embodiments of this application provide a battery charging progress prediction method and apparatus, to accurately predict a battery charging progress and improve user experience.

According to a first aspect, a battery charging progress prediction method is provided, including: receiving a request message from a first terminal or a second terminal, where the request message includes a battery model of a battery of the first terminal and a first state of charge SOC, the first SOC is a start SOC from which the battery of the first terminal is charged, and the first terminal is bound to the second terminal; determining charging progress information of the battery of the first terminal based on the request message, where the charging progress information includes first duration and/or a second SOC, the first duration is duration required for charging from the first SOC to a target SOC, and the second SOC is an SOC reached after charging for target duration from the first SOC; and sending a response message to the first terminal or the second terminal, where the response message includes the charging progress information.

The method provided in the first aspect may be performed by a network device or an apparatus that can support a network device in implementing a function required in the method. The apparatus is, for example, a chip system or a cloud server.

In the foregoing embodiment of this application, the network device receives the request message of the first terminal or the second terminal, determines the charging progress information of the battery of the first terminal based on the request message, and sends the charging progress information to the first terminal or the second terminal, so that a user intuitively learns of the charging progress information of the battery of the first terminal through the first terminal or the second terminal, which improves user experience.

In a possible design, the request message includes the target SOC and/or the target duration. According to the method, the user may selectively enter at least one of the target SOC or the target duration based on a requirement, so that the request message includes the at least one of the target SOC or the target duration. This improves user experience.

In a possible design, the target SOC is preset, and/or the target duration is preset.

In a possible design, the determining the charging progress information based on the request message includes: determining the charging progress information based on the request message and a prediction model, where the prediction model is used to predict a charging progress of a battery of the battery model, the prediction model is obtained based on charging parameters corresponding to an SOC subinterval, the SOC subinterval is obtained by dividing an SOC interval in historical charging data, the charging parameters include a third SOC, a fourth SOC, and second duration, the second duration is duration required for charging from the third SOC to the fourth SOC, a start point of the SOC subinterval is the third SOC, an end point of the SOC subinterval is the fourth SOC, the historical charging data is charging data of the battery of the battery model, and the SOC interval is an interval formed by a start SOC and an end SOC of the historical charging data. According to the method, an SOC interval in each group of historical charging data is divided to obtain a charging parameter of a finer granularity. In this way, diversity of training samples can be increased, adaptability of the prediction model can be improved, and charging duration in any SOC interval or an SOC that can be reached by charging for any duration can be predicted.

In a possible design, the SOC subinterval is obtained by randomly dividing the SOC interval in the historical charging data. According to the method, the SOC interval is randomly divided, so that diversity of training samples can be increased, and coverage of the prediction model can be improved.

In a possible design, parameter information further includes one or more of the following:

mileage data, where the mileage data is used to indicate a historical mileage of a vehicle to which a battery having a battery model belongs;

a charging voltage in a process of charging from the third SOC to the fourth SOC;

a charging current in a process of charging from the third SOC to the fourth SOC; or a battery temperature in a process of charging from the third SOC to the fourth SOC.

In a possible design, the method further includes: using a charging parameter other than the second duration in the charging parameters as an input, and using the second duration as an output, to obtain the prediction model. According to the method, charging duration used to predict any SOC interval may be obtained.

In a possible design, the method further includes: using a charging parameter other than the fourth SOC in the charging parameters as an input, and using the fourth SOC as an output, to obtain the prediction model. According to this method, an SOC that can be reached and used to predict any charging duration can be obtained.

In a possible design, the determining the charging progress information based on the request message and a prediction model includes: obtaining at least one group of charging parameters based on the request message, where a third SOC in each of the at least one group of charging parameters is equal to the first SOC, and a fourth SOC in each of the at least one group of charging parameters is equal to the target SOC; and determining the first duration based on the prediction model and an average value of the at least one group of charging parameters. According to the method, when the first duration is requested to be predicted, the at least one group of charging parameters is obtained based on information in the request message other than the first duration. Because each group of charging parameters includes at least one of charging parameters such as a charging current, a charging voltage, or a battery temperature, an input feature of the prediction model may be increased, so that accuracy of the first duration obtained through prediction can be improved.

In a possible design, the determining the charging progress information based on the request message and a prediction model includes: obtaining at least one group of charging parameters based on the request message, where a third SOC in each of the at least one group of charging parameters is equal to the first SOC, and a second duration in each of the at least one group of charging parameters is equal to the target duration; and determining the second SOC based on the prediction model and an average charging parameter corresponding to the at least one group of charging parameters. According to the method, when the second SOC is requested to be predicted, the at least one group of charging parameters is obtained based on information in the request message other than the second SOC. Because each group of charging parameters includes at least one of charging parameters such as a charging current, a charging voltage, or a battery temperature, an input feature of the prediction model may be increased, so that accuracy of the second SOC obtained through prediction can be improved.

According to a second aspect, a battery charging progress prediction method is provided, including: sending a first request message to a network device, where the first request message includes a battery model of a battery of a first terminal and a first state of charge SOC, the first SOC is a start SOC from which the battery of the first terminal is charged, and the first request message is used to request to predict a charging progress of the battery of the first terminal; receiving a first response message from the network device, where the first response message includes charging progress information of the battery of the first terminal, the charging progress information includes first duration and/or a second SOC, the first duration is duration required for charging from the first SOC to a target SOC, and the second SOC is an SOC reached after charging for target duration from the first SOC; and displaying the charging progress information.

The method provided in the second aspect may be performed by the first terminal. The first terminal mentioned herein may be executed by an electric vehicle or another apparatus powered by a battery. The apparatus is, for example, an electric bicycle.

In the foregoing embodiment of this application, the first request message is sent to the network device, so that the charging progress information of the battery of the first terminal can be obtained and intuitively learned of. Therefore, a user can make a proper travel plan based on the charging progress information, which improves user experience.

In a possible design, the method further includes: sending the charging progress information to a second terminal bound to the first terminal. According to the method, the second terminal may send the obtained charging progress information to the second terminal, so that the user can learn of the charging progress information in time.

In a possible design, the method further includes: receiving a second request message from the second terminal bound to the first terminal, where the second request message is used to request to obtain the battery model and/or the first SOC; and sending a second response message to the second terminal, where the second response message includes the battery model and/or the first SOC. According to the method, the first terminal may send at least one of the battery model of the battery of the first terminal or the first SOC to the second terminal, so that the second terminal can obtain the charging progress of the battery of the first terminal based on the at least one of the battery model of the battery of the first terminal or the first SOC.

In a possible design, the sending a first request message to a network device includes: sending the first request message to the network device when detecting that the first terminal is within a preset range of a charging pile. According to the method, the first terminal may be triggered to actively send the first request message to the network device.

In a possible design, the sending a first request message to a network device includes: sending the first request message to the network device when detecting that the battery of the first terminal is connected to a power supply. According to the method, the first terminal may be triggered to actively send the first request message to the network device.

In a possible design, the first request message includes the target SOC and/or the target duration. According to the method, the user may selectively enter at least one of the target SOC or the target duration based on a requirement, so that the request message includes the at least one of the target SOC or the target duration. This improves user experience.

In a possible design, the target SOC is preset, and/or the target duration is preset.

According to a third aspect, a battery charging progress prediction method is provided, including: sending a first request message to a network device, where the first request message includes a battery model of a battery of a first terminal bound to a second terminal and a first state of charge SOC, the first SOC is a start SOC from which the battery of the first terminal is charged, and the first request message is used to request to predict a charging progress of the battery of the first terminal; receiving a first response message from the network device, where the first response message includes charging progress information, the charging progress information includes first duration and/or a second SOC, the first duration is duration required for charging from the first SOC to a target SOC, and the second SOC is an SOC reached after charging for target duration from the first SOC; and displaying the charging progress information.

The method provided in the third aspect may be performed by the second terminal. The second terminal mentioned herein may be a mobile terminal device or an apparatus that can support a mobile terminal device in implementing a function required in the method, for example, a chip system. For example, the mobile terminal device is a mobile phone.

In the foregoing embodiment of this application, the first request message is sent to the network device, so that the charging progress information of the battery of the first terminal can be obtained and intuitively learned of. Therefore, a user can make a proper travel plan based on the charging progress information, which improves user experience.

In a possible design, the method further includes: sending the charging progress information to the first terminal. According to the method, the second terminal may send the charging progress information to the first terminal, so that the user can learn of the charging progress information in time by using the first terminal.

In a possible design, the method further includes: sending a second request message to the first terminal, where the second request message is used to request to obtain the battery model and/or the first SOC; and receiving a second response message from the first terminal, where the second response message includes the battery model and/or the first SOC. According to the method, the second terminal interacts with the first terminal, and may obtain at least one of the battery model of the battery of the first terminal or the first SOC, so that the second terminal can obtain the charging progress information of the battery of the first terminal based on the at least one of the battery model of the battery of the first terminal or the first SOC.

In a possible design, the sending a first request message to a network device includes: sending the first request message to the network device when detecting that the first terminal is within a preset range of a charging pile. According to the method, the first terminal may be triggered to actively send the first request message to the network device, to provide an intelligent service.

In a possible design, the sending a first request message to a network device includes: sending the first request message to the network device when detecting that the battery of the first terminal is connected to a power supply. According to the method, the first terminal may be triggered to actively send the first request message to the network device, to provide an intelligent service.

In a possible design, the first request message includes the target SOC and/or the target duration. According to the method, the user may selectively enter at least one of the target SOC or the target duration based on a requirement, so that the request message includes the at least one of the target SOC or the target duration. This improves user experience.

In a possible design, the target SOC is preset, and/or the target duration is preset.

According to a fourth aspect, a battery charging progress prediction method is provided, including: obtaining a first state of charge SOC, where the first SOC is a start SOC from which a battery of a first terminal is charged; determining charging progress information based on the first SOC, where the charging progress information includes first duration and/or a second SOC, the first duration is duration required for charging from the first SOC to a target SOC, and the second SOC is an SOC reached after charging for target duration from the first SOC; and displaying the charging progress information.

The method provided in the fourth aspect may be performed by the first terminal. The first terminal mentioned herein may be executed by an electric vehicle or another apparatus powered by a battery. The apparatus is, for example, an electric bicycle.

In the foregoing embodiment of this application, the first terminal may predict a charging progress of the battery. After obtaining the first SOC, the first terminal may obtain and intuitively learn of the charging progress information of the battery of the first terminal, so that a user can make a proper travel plan based on the charging progress information, which improves user experience.

In a possible design, the method further includes: receiving a request message from a second terminal bound to the first terminal, where the request message is used to predict the charging progress of the battery of the first terminal; and sending a response message to the second terminal, where the response message includes the charging progress information. According to the method, the first terminal may send at least one of the battery model of the battery of the first terminal or the first SOC to the second terminal, so that the second terminal can obtain the charging progress of the battery of the first terminal based on the at least one of the battery model of the battery of the first terminal or the first SOC.

In a possible design, the request message includes the first SOC. According to the method, the user may enter any first SOC, which has high flexibility, so that user experience is improved.

In a possible design, the request message includes the target SOC and/or the target duration. According to the method, the user may selectively enter at least one of the target SOC or the target duration based on a requirement, which has high flexibility, so that user experience is improved.

In a possible design, the first SOC is obtained when it is detected that the first terminal is within a preset range of a charging pile. According to the method, the first terminal may be triggered to actively obtain the first SOC, to obtain the charging progress information of the battery of the first terminal, so that an intelligent service can be provided.

In a possible design, the first SOC is obtained when it is detected that the battery of the first terminal is connected to a power supply. According to the method, the first terminal may be triggered to actively obtain the first SOC, to obtain the charging progress information of the battery of the first terminal, so that an intelligent service can be provided.

In a possible design, the target SOC is preset, and/or the target duration is preset.

In a possible design, the determining the charging progress information based on the first SOC includes: determining the charging progress information based on the first SOC and a prediction model. The prediction model is used to predict the charging progress of the battery of the first terminal, the prediction model is obtained based on charging parameters corresponding to an SOC subinterval, the SOC subinterval is obtained by dividing an SOC interval in historical charging data, the charging parameters include a third SOC, a fourth SOC, and second duration, the second duration is duration required for charging from the third SOC to the fourth SOC, a start point of the SOC subinterval is the third SOC, an end point of the SOC subinterval is the fourth SOC, the historical charging data is charging data of the battery of the first terminal, and the SOC interval is an interval formed by a start SOC and an end SOC of the historical charging data. According to the method, an SOC interval in each group of historical charging data is divided to obtain a charging parameter of a finer granularity. In this way, diversity of training samples can be increased, adaptability of the prediction model can be improved, and charging duration in any SOC interval or an SOC that can be reached by charging for any duration can be predicted.

In a possible design, the SOC subinterval is obtained by randomly dividing the SOC interval in the historical charging data. According to the method, the SOC interval is randomly divided, so that diversity of training samples can be increased, and coverage of the prediction model can be improved.

In a possible design, the charging parameter further includes one or more of the following:
 mileage data, where the mileage data is used to indicate a historical mileage of the first terminal;
 a charging voltage in a process of charging from the third SOC to the fourth SOC;
 a charging current in a process of charging from the third SOC to the fourth SOC; or
 a battery temperature in a process of charging from the third SOC to the fourth SOC.

In a possible design, the method further includes: using a charging parameter other than the second duration in the charging parameters as an input, and using the second duration as an output, to obtain the prediction model. According to the method, charging duration used to predict any SOC interval may be obtained.

In a possible design, the method further includes: using a charging parameter other than the fourth SOC in the charging parameters as an input, and using the fourth SOC as an output, to obtain the prediction model. According to this method, an SOC that can be reached and used to predict any charging duration can be obtained.

In a possible design, the determining the charging progress information based on the first SOC and a prediction model includes: obtaining at least one group of charging parameters based on the first SOC, where a third SOC in each of the at least one group of charging parameters is equal to the first SOC, and a fourth SOC in each of the at least one group of charging parameters is equal to the target SOC; and determining the first duration based on the prediction model and an average value of the at least one group of charging parameters. According to the method, when the first duration is requested to be predicted, the at least one group of charging parameters is obtained based on information in the request message other than the first duration. Because each group of charging parameters includes at least one of charging parameters such as a charging current, a charging voltage, or a battery temperature, an input feature of the prediction model may be increased, so that accuracy of the first duration obtained through prediction can be improved.

In a possible design, the determining the charging progress information based on the first SOC and a prediction model includes: obtaining at least one group of charging parameters based on the first SOC and preset duration, where a third SOC in each of the at least one group of charging parameters is equal to the first SOC, and a second duration in each of the at least one group of charging parameters is equal to the target duration; and determining the second SOC based on the prediction model and an average charging parameter corresponding to the at least one group of charging parameters. According to the method, when the second SOC is requested to be predicted, the at least one group of charging parameters is obtained based on information in the request message other than the second SOC. Because each group of charging parameters includes at least one of charging parameters such as a charging current, a charging voltage, or a battery temperature, an input feature of the prediction model may be increased, so that accuracy of the second SOC obtained through prediction can be improved.

According to a fifth aspect, a battery charging progress prediction method is provided, including: sending a request message to a first terminal, where the request message is used to request to predict a charging progress of a battery of the first terminal; receiving a response message from the first terminal, where the response message includes charging progress information, the charging progress information includes first duration and/or a second SOC, the first duration is duration required for charging from the first SOC to a target SOC, the second SOC is an SOC reached after charging for target duration from the first SOC, and the first SOC is a start SOC from which the battery of the first terminal is charged; and displaying the charging progress information.

The method provided in the fifth aspect may be performed by the second terminal. The second terminal mentioned herein may be a mobile terminal device or an apparatus that can support a mobile terminal device in implementing a function required in the method, for example, a chip system. For example, the mobile terminal device is a mobile phone.

In the foregoing embodiment of this application, the charging progress information of the battery of the first terminal can be obtained and intuitively learned of through interaction with the first terminal, so that a user can make a proper travel plan based on the charging progress information, which improves user experience.

In a possible design, the request message includes the first SOC. According to the method, the user may enter any first SOC, which has high flexibility, so that user experience is improved.

In a possible design, the sending a request message to a first terminal includes: sending the request message to the first terminal when detecting that the first terminal is within a preset range of a charging pile. According to the method, the second terminal may be triggered to actively send the request message to the first terminal, to obtain the charging progress information and provide an intelligent service.

In a possible design, the sending a request message to a first terminal includes: sending the request message to the first terminal when detecting that the battery of the first terminal is connected to a power supply. According to the method, the second terminal may be triggered to actively send the request message to the first terminal, to obtain the charging progress information and provide an intelligent service.

In a possible design, the request message includes the target SOC and/or the target duration. According to the method, the user may selectively enter at least one of the target SOC or the target duration based on a requirement, so that the request message includes the at least one of the target SOC or the target duration. This improves user experience.

In a possible design, the target SOC is preset, and/or the target duration is preset.

According to a sixth aspect, a battery charging progress prediction apparatus is provided, including a communication unit and a processing unit. The communication unit is configured to receive a request message from a first terminal or a second terminal. The request message includes a battery model of a battery of the first terminal and a first state of charge SOC, the first SOC is a start SOC from which the battery of the first terminal is charged, and the first terminal is bound to the second terminal. The processing unit is configured to determine charging progress information of the battery of the first terminal based on the request message. The charging progress information includes first duration and/or a second SOC, the first duration is duration required for charging from the first SOC to a target SOC, and the second SOC is an SOC reached after charging for target duration from the first SOC. The communication unit is further configured to send a response message to the first terminal or the second terminal. The response message includes the charging progress information.

The battery charging progress prediction apparatus provided in the sixth aspect may be executed by a network device or an apparatus that can support a network device in implementing a function required in the method. The apparatus is, for example, a chip system or a cloud server.

In a possible design, the request message includes the target SOC and/or the target duration.

In a possible design, the target SOC is preset, and/or the target duration is preset.

In a possible design, the processing unit is specifically configured to determine the charging progress information based on the request message and a prediction model. The prediction model is used to predict a charging progress of a battery of the battery model, the prediction model is obtained based on charging parameters corresponding to an SOC subinterval, the SOC subinterval is obtained by dividing an SOC interval in historical charging data, the charging parameters include a third SOC, a fourth SOC, and second duration, the second duration is duration required for charging from the third SOC to the fourth SOC, a start point of the SOC subinterval is the third SOC, an end point of the SOC subinterval is the fourth SOC, the historical charging data is charging data of the battery of the battery model, and the SOC interval is an interval formed by a start SOC and an end SOC of the historical charging data.

In a possible design, the SOC subinterval is obtained by randomly dividing the SOC interval in the historical charging data.

In a possible design, parameter information further includes one or more of the following:
 mileage data, where the mileage data is used to indicate a historical mileage of a vehicle to which a battery having a battery model belongs;
 a charging voltage in a process of charging from the third SOC to the fourth SOC;
 a charging current in a process of charging from the third SOC to the fourth SOC; or
 a battery temperature in a process of charging from the third SOC to the fourth SOC.

In a possible design, the processing unit is further configured to: use a charging parameter other than the second duration in the charging parameters as an input, and use the second duration as an output, to obtain the prediction model.

In a possible design, the processing unit is further configured to: use a charging parameter other than the fourth SOC in the charging parameters as an input, and use the fourth SOC as an output, to obtain the prediction model.

In a possible design, the processing unit is specifically configured to: obtain at least one group of charging parameters based on the request message, where a third SOC in each of the at least one group of charging parameters is equal to the first SOC, and a fourth SOC in each of the at least one group of charging parameters is equal to the target SOC; and determine the first duration based on the prediction model and an average value of the at least one group of charging parameters.

In a possible design, the processing unit is specifically configured to: obtain at least one group of charging parameters based on the request message, where a third SOC in each of the at least one group of charging parameters is equal to the first SOC, and a second duration in each of the at least one group of charging parameters is equal to the target duration; and determine the second SOC based on the prediction model and an average charging parameter corresponding to the at least one group of charging parameters.

According to a seventh aspect, a battery charging progress prediction apparatus is provided, including: a communication unit, configured to: send a first request message to a network device, where the first request message includes a battery model of a battery of a first terminal and a first state of charge SOC, the first SOC is a start SOC from which the battery of the first terminal is charged, and the first request message is used to request to predict a charging progress of the battery of the first terminal; and receive a first response message from the network device, where the first response message includes charging progress information of the battery of the first terminal, the charging progress information includes first duration and/or a second SOC, the first duration is duration required for charging from the first SOC to a target SOC, and the second SOC is an SOC reached after charging for target duration from the first SOC; and a display unit, configured to display the charging progress information.

The battery charging progress prediction apparatus provided in the seventh aspect may be the first terminal. The first terminal mentioned herein may be an electric vehicle or another apparatus powered by a battery. The apparatus is, for example, an electric bicycle.

In a possible design, the communication unit is further configured to send the charging progress information to a second terminal bound to the first terminal.

In a possible design, the communication unit is further configured to: receive a second request message from the second terminal bound to the first terminal, where the second request message is used to request to obtain the battery model and/or the first SOC; and send a second response message to the second terminal, where the second response message includes the battery model and/or the first SOC.

In a possible design, the battery charging progress prediction apparatus further includes a processing unit. The communication unit is specifically configured to send the first request message to the network device when the processing unit detects that the first terminal is within a preset range of a charging pile.

In a possible design, the battery charging progress prediction apparatus further includes a processing unit. The communication unit is specifically configured to send the first request message to the network device when the processing unit detects that the battery of the first terminal is connected to a power supply.

In a possible design, the first request message includes the target SOC and/or the target duration.

In a possible design, the target SOC is preset, and/or the target duration is preset.

According to an eighth aspect, a battery charging progress prediction apparatus is provided, including: a communication unit, configured to: send a first request message to a network device, where the first request message includes a battery model of a battery of a first terminal bound to a second terminal and a first state of charge SOC, the first SOC is a start SOC from which the battery of the first terminal is charged, and the first request message is used to request to predict a charging progress of the battery of the first terminal; and receive a first response message from the network device, where the first response message includes charging progress information, the charging progress information includes first duration and/or a second SOC, the first duration is duration required for charging from the first SOC to a target SOC, and the second SOC is an SOC reached after charging for target duration from the first SOC; and a display unit, configured to display the charging progress information.

The battery charging progress prediction apparatus provided in the eighth aspect may be the second terminal. The second terminal mentioned herein may be a mobile terminal device or an apparatus that can support a mobile terminal device in implementing a function required in the method, for example, a chip system. For example, the mobile terminal device is a mobile phone.

In a possible design, the communication unit is further configured to send the charging progress information to the first terminal.

In a possible design, the communication unit is further configured to: send a second request message to the first terminal, where the second request message is used to request to obtain the battery model and/or the first SOC; and receive a second response message from the first terminal, where the second response message includes the battery model and/or the first SOC.

In a possible design, the battery charging progress prediction apparatus further includes a processing unit. The communication unit is specifically configured to send the first request message to the network device when the processing unit detects that the first terminal is within a preset range of a charging pile.

In a possible design, the battery charging progress prediction apparatus further includes a processing unit. The communication unit is specifically configured to send the first request message to the network device when the processing unit detects that the battery of the first terminal is connected to a power supply.

In a possible design, the first request message includes the target SOC and/or the target duration.

In a possible design, the target SOC is preset, and/or the target duration is preset.

According to a ninth aspect, a battery charging progress prediction apparatus is provided, including: a processing unit, configured to: obtain a first state of charge SOC, where the first SOC is a start SOC from which a battery of a first terminal is charged; and determine charging progress information based on the first SOC, where the charging progress information includes first duration and/or a second SOC, the first duration is duration required for charging from the first SOC to a target SOC, and the second SOC is an SOC reached after charging for target duration from the first SOC; and a display unit, configured to display the charging progress information.

The battery charging progress prediction apparatus provided in the ninth aspect may be the first terminal. The first terminal mentioned herein may be executed by an electric vehicle or another apparatus powered by a battery. The apparatus is, for example, an electric bicycle.

In a possible design, the processing unit is further configured to: receive a request message from a second terminal bound to the first terminal, where the request message is used to predict a charging progress of the battery of the first terminal; and send a response message to the second terminal, where the response message includes the charging progress information.

In a possible design, the request message includes the first SOC.

In a possible design, the request message includes the target SOC and/or the target duration.

In a possible design, the first SOC is obtained when it is detected that the first terminal is within a preset range of a charging pile.

In a possible design, the first SOC is obtained when it is detected that the battery of the first terminal is connected to a power supply.

In a possible design, the target SOC is preset, and/or the target duration is preset.

In a possible design, the processing unit is specifically configured to: determine the charging progress information based on the first SOC and a prediction model. The prediction model is used to predict the charging progress of the battery of the first terminal, the prediction model is obtained based on charging parameters corresponding to an SOC subinterval, the SOC subinterval is obtained by dividing an SOC interval in historical charging data, the charging parameters include a third SOC, a fourth SOC, and second duration, the second duration is duration required for charging from the third SOC to the fourth SOC, a start point of the SOC subinterval is the third SOC, an end point of the SOC subinterval is the fourth SOC, the historical charging data is charging data of the battery of the first terminal, and the SOC interval is an interval formed by a start SOC and an end SOC of the historical charging data.

In a possible design, the SOC subinterval is obtained by randomly dividing the SOC interval in the historical charging data.

In a possible design, the charging parameter further includes one or more of the following:
- mileage data, where the mileage data is used to indicate a historical mileage of the first terminal;
- a charging voltage in a process of charging from the third SOC to the fourth SOC;
- a charging current in a process of charging from the third SOC to the fourth SOC; or
- a battery temperature in a process of charging from the third SOC to the fourth SOC.

In a possible design, the processing unit is further configured to: use a charging parameter other than the second duration in the charging parameters as an input, and use the second duration as an output, to obtain the prediction model.

In a possible design, the processing unit is further configured to: use a charging parameter other than the fourth SOC in the charging parameters as an input, and use the fourth SOC as an output, to obtain the prediction model.

In a possible design, the processing unit is specifically configured to: obtain at least one group of charging parameters based on the first SOC, where a third SOC in each of the at least one group of charging parameters is equal to the first SOC, and a fourth SOC in each of the at least one group of charging parameters is equal to the target SOC; and determine the first duration based on the prediction model and an average value of the at least one group of charging parameters.

In a possible design, the processing unit is specifically configured to: obtain at least one group of charging parameters based on the first SOC and preset duration, where a third SOC in each of the at least one group of charging parameters is equal to the first SOC, and a second duration in each of the at least one group of charging parameters is equal to the target duration; and determine the second SOC based on the prediction model and an average charging parameter corresponding to the at least one group of charging parameters.

According to a tenth aspect, a battery charging progress prediction apparatus is provided, including: a communication unit, configured to: send a request message to a first terminal, where the request message is used to request to predict a charging progress of a battery of the first terminal; and receive a response message from the first terminal, where the response message includes charging progress information, the charging progress information includes first duration and/or a second SOC, the first duration is duration required for charging from the first SOC to a target SOC, the second SOC is an SOC reached after charging for target duration from the first SOC, and the first SOC is a start SOC from which the battery of the first terminal is charged; and a display unit, configured to display the charging progress information.

The battery charging progress prediction apparatus provided in the tenth aspect may be the second terminal. The second terminal mentioned herein may be a mobile terminal device or an apparatus that can support a mobile terminal device in implementing a function required in the method, for example, a chip system. For example, the mobile terminal device is a mobile phone.

In a possible design, the request message includes the first SOC.

In a possible design, the battery charging progress prediction apparatus further includes a processing unit. The communication unit is specifically configured to send the request message to the first terminal when the processing unit detects that the first terminal is within a preset range of a charging pile.

In a possible design, the battery charging progress prediction apparatus further includes a processing unit. The communication unit is specifically configured to send the request message to the first terminal when the processing unit detects that the battery of the first terminal is connected to a power supply.

In a possible design, the request message includes the target SOC and/or the target duration.

In a possible design, the target SOC is preset, and/or the target duration is preset.

According to an eleventh aspect, a battery charging progress prediction apparatus is further provided, including a processor and a memory. The memory stores program instructions, and when the program instructions are executed, the battery charging progress prediction apparatus is enabled to perform the method provided in the first aspect.

According to a twelfth aspect, a battery charging progress prediction apparatus is further provided, including a processor and a memory. The memory stores program instructions, and when the program instructions are executed, the battery charging progress prediction apparatus is enabled to perform the method provided in the second aspect or the fourth aspect.

According to a thirteenth aspect, a battery charging progress prediction apparatus is further provided, including a processor and a memory. The memory stores program instructions, and when the program instructions are executed, the battery charging progress prediction apparatus is enabled to perform the method provided in the third aspect or the fifth aspect.

According to a fourteenth aspect, a battery charging progress prediction apparatus is further provided, including the battery charging progress prediction apparatus provided in the sixth aspect, the battery charging progress prediction apparatus provided in the seventh aspect or the ninth aspect, and the battery charging progress prediction apparatus provided in the eighth aspect or the tenth aspect.

According to a fifteenth aspect, a computer-readable storage medium is further provided. The computer-readable storage medium includes a computer program, and when the computer program is run on a processor, a battery charging progress prediction apparatus is enabled to perform the method provided in the first aspect.

According to a sixteenth aspect, a computer-readable storage medium is further provided. The computer-readable storage medium includes a computer program, and when the computer program is run on a processor, a battery charging progress prediction apparatus is enabled to perform the method provided in the second aspect or the fourth aspect.

According to a seventeenth aspect, a computer-readable storage medium is further provided. The computer-readable storage medium includes a computer program, and when the computer program is run on a processor, a battery charging progress prediction apparatus is enabled to perform the method provided in the third aspect or the fifth aspect.

According to an eighteenth aspect, a computer program product is further provided. When the computer program product runs on a processor, a battery charging progress prediction apparatus is enabled to perform the method provided in the first aspect.

According to a nineteenth aspect, a computer program product is further provided. When the computer program product runs on a processor, a battery charging progress prediction apparatus is enabled to perform the method provided in the second aspect or the fourth aspect.

According to a twentieth aspect, a computer program product is further provided. When the computer program product runs on a processor, a battery charging progress prediction apparatus is enabled to perform the method provided in the third aspect or the fifth aspect.

For beneficial effects of the sixth aspect to the twentieth aspect, refer to the beneficial effects of the first aspect to the fifth aspect. Details are not described herein again.

DESCRIPTION OF EMBODIMENTS

Figure 1:
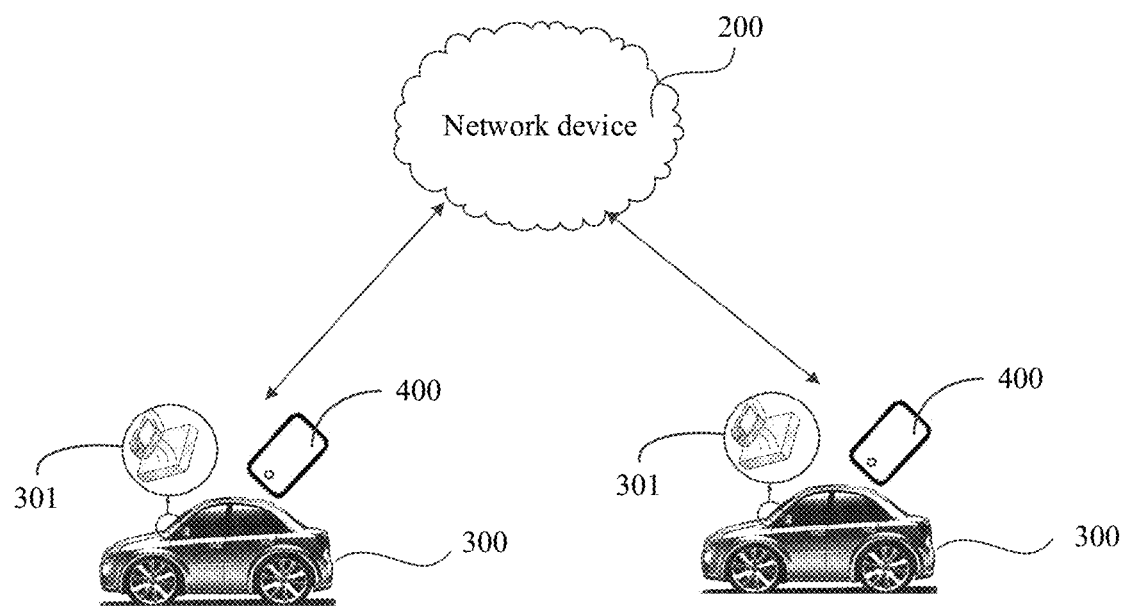
FIG. 1 is a schematic diagram of an architecture of a communication system 100 according to an embodiment of this application.

For ease of understanding, terms in embodiments of this application are explained and described, and the explanations and descriptions of the terms are also used as a part of invention content of embodiments of this application.

(1) A terminal in embodiments of this application includes a device such as a mobile phone, a tablet computer, a wearable device (such as glasses, gloves, a watch, a band, clothing, and shoes), a vehicle-mounted device (or referred to as a vehicle-mounted terminal), an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA). A specific type of the mobile terminal is not limited in embodiments of this application. Alternatively, the mobile terminal may further include a relay (relay).

In embodiments of this application, an apparatus configured to implement a function of a terminal may be the terminal, or may be an apparatus, for example, a chip system, that can support the terminal in implementing the function. The apparatus may be installed in the terminal. In embodiments of this application, the chip system may include a chip, or may include a chip and another discrete component. In the following, an example in which an apparatus configured to implement a function of a terminal is a terminal is used.

(2) An application (application, app for short) in embodiments of this application is referred to an app and is a software program that can implement one or more specific functions. Generally, one or more applications may be installed on the terminal, for example, an instant messaging application, a video application, an audio application, and an image shooting application. The instant messaging application may include, for example, Messages, WeChat (WeChat), WhatsApp Messenger, LINE (Line), Instagram (Instagram), Kakao Talk, and DingTalk. The image shooting application may include, for example, a camera application (a system camera or a third-party camera application). The video application may include, for example, YouTube, Twitter, TikTok, iQIYI, and Tencent Video. The audio application may include, for example, Google Music, KuGou, EMUMO, and QQ Music.

(3) Embodiments of this application relate to a network device. The network device includes but is not limited to an apparatus that provides a computing capability and a storage capability, such as a single server, a server cluster, or a cloud server. For example, an application is installed on the terminal, and the network device may be a cloud server corresponding to the application. The application herein may be an application related to a vehicle powered by a battery. For example, if the application is a battery charging management app, the cloud server is a cloud server corresponding to the battery charging management app.

In embodiments of this application, an apparatus configured to implement a function of a network device may be a network device, or may be an apparatus, for example, a chip system, that can support the network device in implementing the function. The apparatus may be mounted in the network device. In the following, an example in which an apparatus configured to implement a function of a network device is a network device is used.

(4) A state of charge (state of charge, SOC) in embodiments of this application may be a ratio of a remaining capacity of a battery to a fully charged capacity of the battery, and is usually represented by a percentage. A unit is %, and a value is usually 0% to 100%. For example, if the SOC is 100%, it indicates that the remaining capacity of the battery is a capacity of the battery when the battery is fully charged. For example, if the SOC is 50%, it indicates that the remaining capacity of the battery is half of the capacity of the battery when the battery is fully charged. For another example, if the SOC is 0%, it indicates that the remaining capacity of the battery is 0. A full SOC in embodiments of this application means that the SOC is 100%.

(5) Terms "system" and "network" may be used interchangeably in embodiments of this application. "A plurality of" means two or more. In view of this, "a plurality of" may also be understood as "at least two" in embodiments of this application. "At least one" may be understood as one or more, for example, one, two, or more. For example, "including at least one" means including one, two, or more, and does not limit which items are included. For example, if at least one of A, B, and C is included, A, B, C, A and B, A and C, B and C, or A, B, and C may be included. Similarly, understanding of the description such as "at least one type" is similar. The term "and/or" describes an association relationship between associated objects and represents that three relationships may exist. For example, A and/or B may represent the following three cases: Only A exists, both A and B exist, and only B exists. In addition, unless otherwise specified, the character "/" generally indicates an "or" relationship between the associated objects.

Unless otherwise specified, ordinal numbers such as "first" and "second" in embodiments of this application are used to distinguish between a plurality of objects, and are not intended to limit a sequence, a time sequence, priorities, or importance of the plurality of objects.

The following first describes a communication system to which embodiments of this application are applicable.

FIG. 1 is a schematic diagram of an architecture of a communication system 100 according to an embodiment of this application. The battery charging progress prediction method provided in embodiments of this application may be applied to the communication system 100. As shown in FIG. 1, the communication system 100 may include a network device 200, one or more vehicles 300 (including two vehicles 300 in FIG. 1), and one or more mobile terminals 400. The vehicle 300 may communicate with the network device 200, or the vehicle 300 may communicate with the network device 200 by using a vehicle-mounted device (as shown in 301 in FIG. 1), a T-box, or the like mounted on the vehicle 300. The vehicle 300 is powered by a battery, or is powered by a battery and fuel. For example, a battery management system may be further mounted on the vehicle 300. The battery management system may store a battery model of a battery of the vehicle 300. The battery management system may further record related data of each charge of the vehicle 300, for example, a charging start SOC, a charging end SOC, charging duration, or a voltage during charging. The vehicle 300 may be bound to at least one mobile terminal 400 (one vehicle 300 is bound to one mobile terminal 400 in FIG. 1). The mobile terminal 400 may be a mobile phone, a tablet computer, or the like. The mobile terminal 400 may communicate with the vehicle 300. For example, the mobile terminal 400 establishes a near field communication connection, for example, at least one of a Bluetooth connection, a cellular connection, and a Wi-Fi connection, to the vehicle 300. The mobile terminal 400 may obtain the battery model, a driving speed, mileage data, or the like of the battery of the vehicle 300 through the near field communication. The mobile terminal 400 may further communicate with the network device 200. For example, the mobile terminal 400 may send obtained data related to the vehicle 300 to the network device 200.

An embodiment of this application provides a battery charging progress prediction method. In the method, a first terminal interacts with a network device (for example, a cloud server), to predict a charging progress of a battery of the first terminal, so as to predict the charging progress of the battery and improve user experience.

Figure 2:
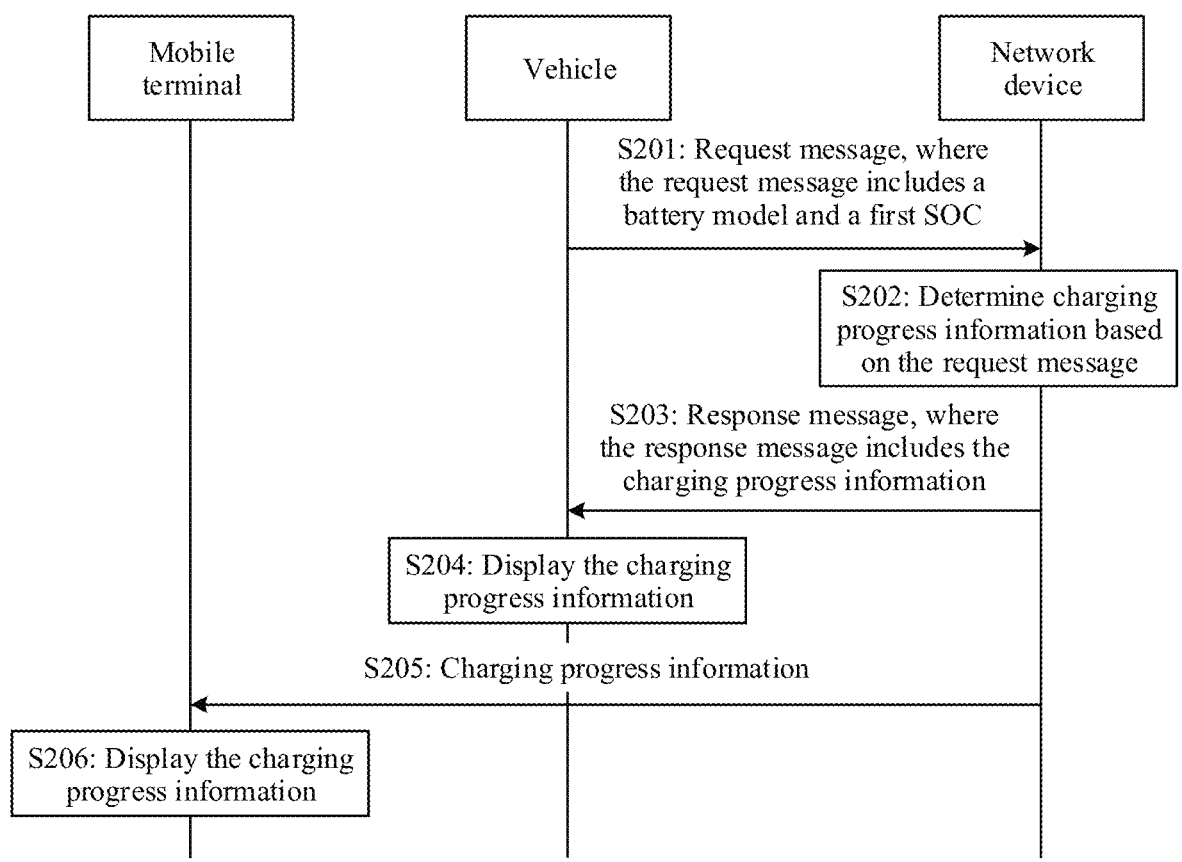
FIG. 2 is a schematic flowchart of a battery charging progress prediction method according to an embodiment of this application.

FIG. 2 is a schematic flowchart of a battery charging progress prediction method according to an embodiment of this application. Refer to FIG. 2. The method may be applied to the communication system 100 shown in FIG. 1. The network device 200 receives a request message from the first terminal (for example, the vehicle 300), and predicts the charging progress of the battery of the first terminal based on the request message. The following describes the method by using an example in which the method is applied to the communication system 100 shown in FIG. 1, the first terminal is the vehicle 300, and a second terminal is the mobile terminal 400.

S201: The vehicle 300 sends the request message to the network device 200, where the request message includes a battery model of a battery of the vehicle 300 and a first SOC. The network device 200 receives the request message.

The vehicle 300 may send the request message to the network device 200, or the vehicle 300 may send the request message to the network device 200 by using the vehicle-mounted device 301 mounted on the vehicle 300. The request message is used to request to predict the charging progress of the battery of the vehicle 300. For example, if the vehicle 300 detects that the vehicle 300 is within a preset range of a charging pile (or detects that the vehicle 300 is connected to a power supply), the vehicle 300 sends the request message to the network device 200, and/or displays, on a central display screen of the vehicle 300, an interaction interface of an application related to the battery charging progress, for example, the application is a battery charging management app. For another example, a user may perform an operation on an application (for example, the battery charging management app) installed on the vehicle-mounted device 301, to trigger the vehicle-mounted device 301 to send, to the network device 200 corresponding to the application, the request message used to predict the battery charging progress of the vehicle 300.

Alternatively, the mobile terminal 400 may trigger the vehicle 300 to send the request message to the network device 200. For example, the user may perform an operation on the battery charging management app installed on the mobile terminal 400, to trigger the vehicle 300 to send the request message to the network device 200.

The first SOC is a start SOC from which the battery of the vehicle 300 is charged. For example, the first SOC may be a current SOC of the battery of the vehicle 300. For another example, the first SOC may be a start SOC that is entered by the user and used to predict the charging progress of the battery of the vehicle 300. The request message is used to: request to predict duration required for charging the battery of the vehicle 300 from the first SOC to a target SOC, or request to predict an SOC reached after the battery of the vehicle 300 is charged for target duration from the first SOC, or request to predict the duration required for charging the battery of the vehicle 300 from the first SOC to the target SOC, and the SOC reached after the battery of the vehicle 300 is charged for the target duration from the first SOC.

In a possible implementation, the target SOC to be reached after the battery of the vehicle 300 is charged and/or the target duration for charging the battery of the vehicle 300 may be preset by a system or the user. For example, the system may preset the target SOC to a full SOC. If the request message includes only the battery model of the battery of the vehicle 300 and the first SOC, the request message may be used to request to predict duration required for charging the battery of the vehicle 300 from the first SOC to the full SOC.

In another possible implementation, the target SOC to be reached after the battery of the vehicle 300 is charged and/or the target duration for charging the battery of the vehicle 300 may be recommended by the system. For example, when the request message includes only the battery model of the battery of the vehicle 300 and the first SOC, the system may recommend one piece of target duration based on the battery model of the battery of the vehicle 300 and the first SOC, and predict, based on the recommended target duration, an SOC reached after the battery of the vehicle 300 is charged for the target duration from the first SOC.

In another possible implementation, the request message may include the target SOC to be reached after the battery of the vehicle 300 is charged and/or the target duration for charging the battery of the vehicle 300. When the request message includes the target SOC, the request message is used to request to predict the duration required for charging the battery of the vehicle 300 from the first SOC to the target SOC. When the request message includes the target duration, the request message is used to request to predict the SOC reached after the battery of the vehicle 300 is charged for the target duration from the first SOC. When the request message includes the target SOC and the target duration, the request message is used to request to predict the duration required for charging the battery of the vehicle 300 from the first SOC to the target SOC, and the SOC reached after charging for the target duration from the first SOC.

Figure 14:
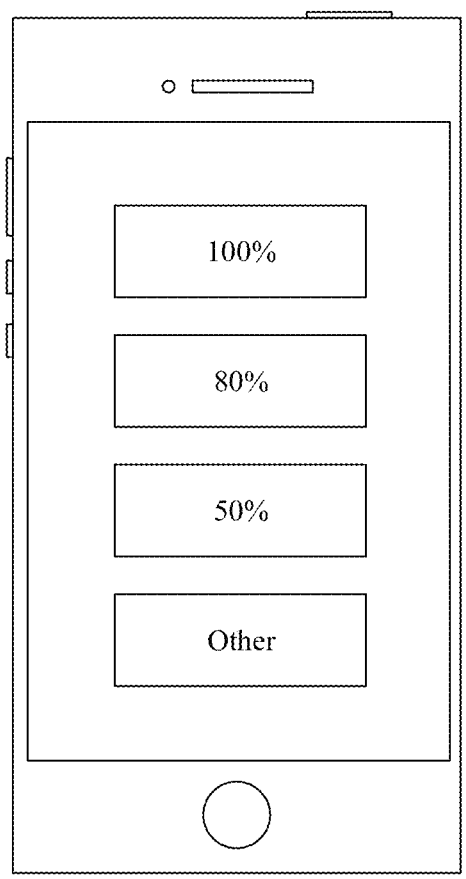
FIG. 14 is a schematic diagram of an interface in which a mobile terminal provides a plurality of target SOCs according to an embodiment of this application.
Figure 15:
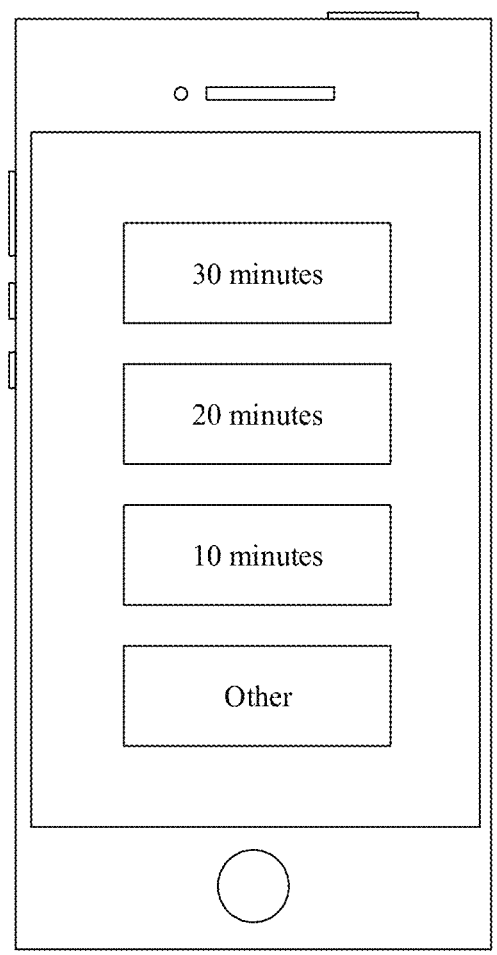
FIG. 15 is a schematic diagram of an interface in which a mobile terminal provides a plurality of pieces of target duration according to an embodiment of this application.

For example, the user may enter the target SOC to the vehicle 300 by using a voice, a button, a touchscreen, or the like. The vehicle 300 may also provide a plurality of target SOCs, for example, 50%, 80%, 100%, and another option (the another option means that the user may enter another SOC), as shown in FIG. 14. The user may select one of the plurality of target SOC options as the target SOC by using a voice, a button, a touchscreen, or the like. Similarly, the user may enter the target duration to the vehicle 300 by using a voice, a button, a touchscreen, or the like. The vehicle 300 may also provide a plurality of pieces of target duration, for example, 10 minutes, 20 minutes, 30 minutes, and another option (the another option means that the user may enter other duration), as shown in FIG. 15. The user may select one of the plurality of target duration options as the target duration by using a voice, a button, a touchscreen, or the like.

Further, the request message may further include one or more items of the following information:
  mileage data, where the mileage data is used to indicate a historical mileage of the vehicle 300;
  a quantity of cycles, where the quantity of cycles is used to indicate an aging degree of the battery of the vehicle 300, and a process of fully charging a discharged battery and then discharging the battery again is a cycle; and
  a fast charging identifier or a slow charging identifier, where the fast charging identifier means that the battery of the vehicle 300 supports a charging policy of a large current, and the slow charging identifier means that the battery of the vehicle 300 supports a charging policy of a small current.

S202: The network device 200 determines charging progress information based on the request message. The charging progress information includes first duration and/or a second SOC.

The network device 200 may determine, based on the battery model of the battery of the vehicle 300, for example, the battery model of the battery of the vehicle 300 is a first battery model, a prediction model corresponding to the first battery model, and determine the charging progress information of the battery of the vehicle 300 based on the determined prediction model and the request message.

The charging progress information may include the first duration and/or the second SOC. The first duration is the duration required for charging the battery of the vehicle 300 from the first SOC to the target SOC, and the second SOC is the SOC reached after the battery of the vehicle 300 is charged for the target duration from the first SOC. For example, if the request message includes only the first SOC and the battery model of the battery of the vehicle 300, and the target SOC and the target duration are preset in the system, the charging progress information may include the first duration and the second SOC.

The prediction model is obtained based on charging parameters corresponding to an SOC subinterval, and the SOC subinterval is obtained by dividing an SOC interval in historical charging data. The charging parameters include a third SOC, a fourth SOC, and second duration. The second duration is duration required for charging from the third SOC to the fourth SOC. A start point of the SOC subinterval is the third SOC, and an end point is the fourth SOC. The historical charging data is charging data of the battery of the first battery model (the battery model of the battery of the vehicle 300 is the first battery model). The SOC interval is an interval formed by a start SOC and an end SOC in each group of historical charging data.

The following describes a process in which the network device 200 establishes the prediction model.

Figure 3:
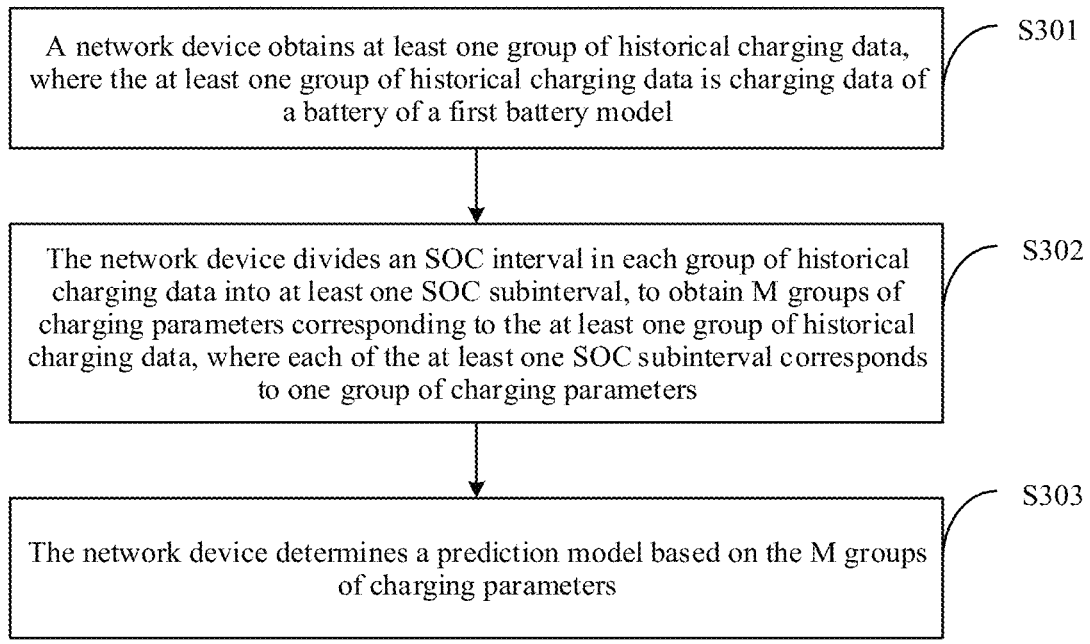
FIG. 3 is a schematic flowchart of a method for building a battery charging progress prediction model according to an embodiment of this application.

FIG. 3 is a schematic flowchart of a method for building a battery charging progress prediction model according to an embodiment of this application. Refer to FIG. 3. The method may be applied to the communication system 100 shown in FIG. 1. The method may be performed by the network device 200. The following describes the method by using an example in which the method is applied to the communication system 100 shown in FIG. 1.

S301: The network device 200 obtains at least one group of historical charging data, where the at least one group of historical charging data is charging data of a battery of a first battery model.

The network device 200 may obtain historical charging data of at least one vehicle 300 by using the vehicle 300 or the mobile terminal 400. For example, the network device 200 may obtain charging data of the vehicle 300 in the past one year. For example, the vehicle 300 actively sends charging data of the vehicle 300 within one month to the network device 200 at a specified time interval (for example, one month). For another example, the mobile terminal 400 may obtain historical charging data of the vehicle 300 bound to the mobile terminal 400, and send the obtained historical charging data to the network device 200. One charging process of the battery of the vehicle 300 corresponds to one group of historical charging data.

Further, the network device 200 may classify the historical charging data based on a battery model, to obtain the at least one group of historical charging data of the battery of the first battery model. Each of the at least one group of historical charging data may include a battery model, a start SOC in the group of historical charging data, an end SOC in the group of historical charging data, and time information. The time information is used to: indicate time corresponding to at least one SOC in a process of charging from the start SOC in the group of historical charging data to the end SOC in the group of historical charging data, or indicate charging duration corresponding to at least one SOC subinterval in a process of charging from the start SOC in the group of historical charging data to the end SOC in the group of historical charging data.

In an example, for a group of historical charging data, time information in the group of historical charging data may be represented by a table. For example, a start SOC in the group of historical charging data is 20%, an end SOC in the group of historical charging data is 50%, and the time information may include: corresponding time is t1 when the SOC is 20%, corresponding time is t2 when the SOC is 30%, corresponding time is t3 when the SOC is 40%, and corresponding time is t4 when the SOC is 50%, as shown in Table 1. For another example, a start SOC in the group of historical charging data is 20%, an end SOC in the group of historical charging data is 50%, and the time information may include: corresponding charging duration is t1 when the SOC subinterval is [20%, 30%), corresponding charging duration is t2 when the SOC subinterval is [30%, 40%), and corresponding charging duration is t3 when the SOC subinterval is [40%, 50%]. It should be noted that, during specific implementation, charging duration corresponding to an SOC with a finer granularity may be obtained, for example, charging duration corresponding to each 2% increase of the SOC. This is not limited in this embodiment of this application.

Figure 4:
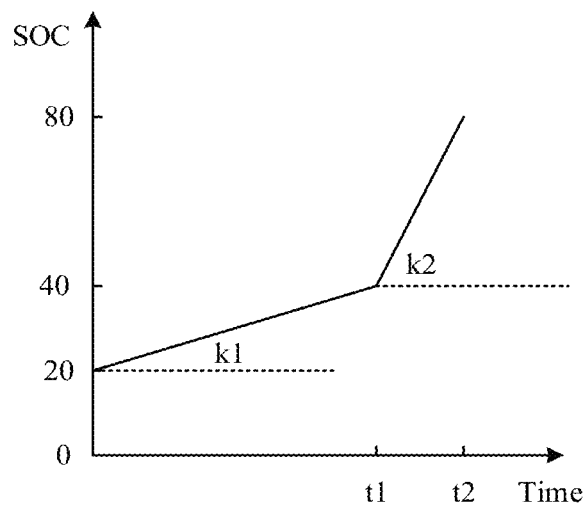
FIG. 4 is a schematic diagram of a correspondence between time information and an SOC according to an embodiment of this application.

In another example, for a group of historical charging data, time information in the group of historical charging data may also be represented by a function. For example, a start SOC in the group of historical charging data is 20%, an end SOC in the group of historical charging data is 80%, and the time information includes: in an SOC interval of [20%, 40%], an SOC and time are in a linear relationship with a slope of k1, and in an SOC interval of [40%, 80%], the SOC and the time are in a linear relationship with a slope of k2, as shown in FIG. 4.

TABLE 1

Time information

| SOC | Time |
| --- | --- |
| 20% | t1 |
| 30% | t2 |
| 40% | t3 |
| 50% | t4 |

In a possible implementation, each group of historical charging data may further include one or more items of the following information:

(1) Mileage data. The mileage data is used to indicate a historical mileage of the vehicle 300 to which the battery of the first battery model belongs.

(2) Voltage information. The voltage information is used to: indicate a charging voltage corresponding to at least one SOC in a process of charging from a start SOC to an end SOC, or indicate a charging voltage corresponding to at least one SOC subinterval in a process of charging from a start SOC to an end SOC.

In an example, for a group of historical charging data, voltage information in the group of historical charging data may be represented by a table. For example, a start SOC in the group of historical charging data is 20%, an end SOC in the group of historical charging data is 50%, and the voltage information may include: a corresponding charging voltage is V1 when the SOC is 20%, a corresponding charging voltage is V2 when the SOC is 30%, a corresponding charging voltage is V3 when the SOC is 40%, and a corresponding charging voltage is V4 when the SOC is 50%, as shown in Table 2. For another example, a start SOC in the group of historical charging data is 20%, an end SOC in the group of historical charging data is 50%, and the voltage information may include: a corresponding charging voltage is V1 when the SOC subinterval is [20%, 30%), a corresponding charging voltage is V2 when the SOC subinterval is [30%, 40%), and a corresponding charging voltage is V3 when the SOC subinterval is [40%, 50%]. It should be noted that, during specific implementation, a charging voltage corresponding to an SOC with a finer granularity may be obtained, for example, a charging voltage corresponding to each 2% increase of the SOC. This is not limited in this embodiment of this application.

Figure 5:
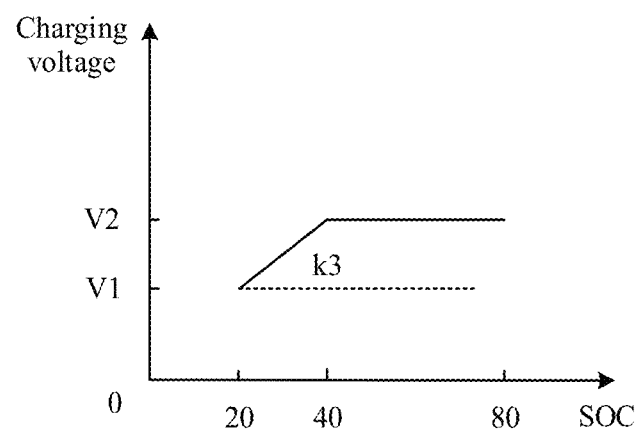
FIG. 5 is a schematic diagram of a correspondence between voltage information and an SOC according to an embodiment of this application.

In another example, for a group of historical charging data, voltage information in the group of historical charging data may also be represented by a function. For example, a start SOC in the group of historical charging data is 20%, an end SOC in the group of historical charging data is 80%, and the voltage information includes: in an SOC interval of [20%, 40%], a charging voltage and an SOC are in a linear relationship with a slope of k3, and in an SOC interval of [40%, 80%], the charging voltage and the SOC are in a linear relationship with a slope of k4. As shown in FIG. 5, k4 is equal to 1 in FIG. 5.

TABLE 2

Voltage information

| SOC | Charging voltage |
| --- | --- |
| 20% | V1 |
| 30% | V2 |
| 40% | V3 |
| 50% | V4 |

(3) Current information. The current information is used to: indicate a charging current corresponding to at least one SOC in a process of charging from a start SOC to an end SOC, or indicate a charging current corresponding to at least one SOC subinterval in a process of charging from a start SOC to an end SOC.

In an example, for a group of historical charging data, current information in the group of historical charging data may be represented by a table. For example, a start SOC in the group of historical charging data is 20%, an end SOC in the group of historical charging data is 50%, and the current information may include: a corresponding charging current is I1 when the SOC is 20%, a corresponding charging current is I2 when the SOC is 30%, a corresponding charging current is I3 when the SOC is 40%, and a corresponding charging current is I4 when the SOC is 50%, as shown in Table 3. For another example, a start SOC in the group of historical charging data is 20%, an end SOC in the group of historical charging data is 50%, and the current information may include: a corresponding charging current is I1 when the SOC subinterval is [20%, 30%), a corresponding charging current is I2 when the SOC subinterval is [30%, 40%), and a corresponding charging current is I3 when the SOC subinterval is [40%, 50%]. It should be noted that, during specific implementation, a charging current corresponding to an SOC with a finer granularity may be obtained, for example, a charging current corresponding to each 2% increase of the SOC. This is not limited in this embodiment of this application.

Figure 6:
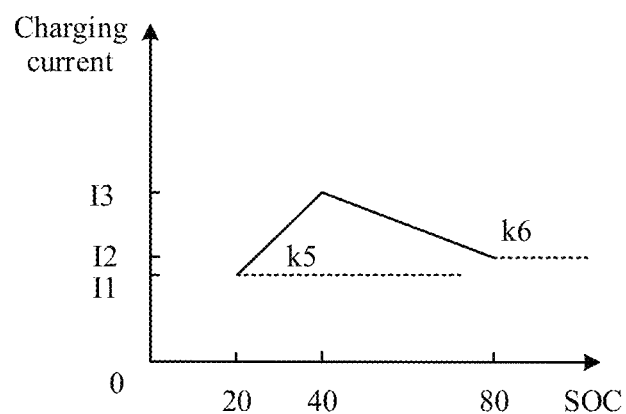
FIG. 6 is a schematic diagram of a correspondence between current information and an SOC according to an embodiment of this application.

In another example, for a group of historical charging data, current information in the group of historical charging data may also be represented by a function. For example, a start SOC in the group of historical charging data is 20%, an end SOC in the group of historical charging data is 80%, and the current information includes: in an SOC interval of [20%, 40%], a charging current and an SOC are in a linear relationship with a slope of k5, and in an SOC interval of [40%, 80%], the charging current and the SOC are in a linear relationship with a slope of k6, as shown in FIG. 6.

TABLE 3

Current information

| SOC | Charging current |
| --- | --- |
| 20% | I1 |
| 30% | I2 |

TABLE 3-continued

| Current information | |
|---|---|
| SOC | Charging current |
| 40% | 13 |
| 50% | 14 |

(4) Battery temperature information. The battery temperature information is used to: indicate a battery temperature corresponding to at least one SOC in a process of charging from a start SOC to an end SOC, or indicate a battery temperature corresponding to at least one SOC subinterval in a process of charging from a start SOC to an end SOC.

In an example, for a group of historical charging data, battery temperature information in the group of historical charging data may be represented by a table. For example, a start SOC in the group of historical charging data is 20%, an end SOC in the group of historical charging data is 50%, and the battery temperature information may include: a corresponding battery temperature is T1 when the SOC is 20%, a corresponding battery temperature is T2 when the SOC is 30%, a corresponding battery temperature is T3 when the SOC is 40%, and a corresponding battery temperature is T4 when the SOC is 50%, as shown in Table 4. For another example, a start SOC in the group of historical charging data is 20%, an end SOC in the group of historical charging data is 50%, and the battery temperature information may include: a corresponding battery temperature is T1 when the SOC subinterval is [20%, 30%), a corresponding battery temperature is T2 when the SOC subinterval is [30%, 40%), and a corresponding battery temperature is T3 when the SOC subinterval is [40%, 50%]. It should be noted that, during specific implementation, a battery temperature corresponding to an SOC with a finer granularity may be obtained, for example, a battery temperature corresponding to each 2% increase of the SOC. This is not limited in this embodiment of this application.

In another example, for a group of historical charging data, battery temperature information in the group of historical charging data may also be represented by a function.

Figure 7:
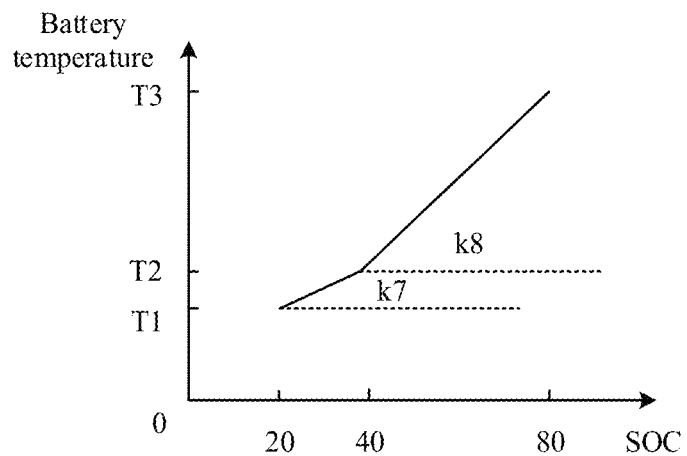
FIG. 7 is a schematic diagram of a correspondence between battery temperature information and an SOC according to an embodiment of this application.

For example, a start SOC in the group of historical charging data is 20%, an end SOC in the group of historical charging data is 80%, and the battery temperature information includes: in an SOC interval of [20%, 40%], a battery temperature and an SOC are in a linear relationship with a slope of k7, and in an SOC interval of [40%, 80%], the battery temperature and the SOC are in a linear relationship with a slope of k8, as shown in FIG. 7.

TABLE 4

| Battery temperature information | |
|---|---|
| SOC | Battery temperature |
| 20% | T1 |
| 30% | T2 |
| 40% | T3 |
| 50% | T4 |

(5) Ambient temperature information. The ambient temperature information is used to: indicate an ambient temperature corresponding to at least one SOC in a process of charging from a start SOC to an end SOC, or indicate an ambient temperature corresponding to at least one SOC subinterval in a process of charging from a start SOC to an end SOC. The ambient temperature information may be represented by a table, or may be represented by a function. For a specific representation manner, refer to Table 1 to Table 4 or FIG. 4 to FIG. 7. Details are not described herein again.

(6) Quantity of cycles.

(7) Fast charging identifier or slow charging identifier.

S302: The network device 200 divides an SOC interval in each group of historical charging data into at least one SOC subinterval, to obtain M groups of charging parameters corresponding to the at least one group of historical charging data, where each of the at least one SOC subinterval corresponds to one group of charging parameters.

The network device 200 may divide the SOC interval in each of the at least one group of historical charging data into the at least one SOC subinterval, to obtain the M groups of charging parameters corresponding to the at least one group of historical charging data. Each of the M groups of charging parameters may include a third SOC, a fourth SOC, and second duration. Each of the at least one SOC subinterval corresponds to one group of charging parameters. A start point of the SOC subinterval is the third SOC, and an end point is the fourth SOC. The second duration is duration required for charging from the third SOC to the fourth SOC. M is an integer greater than or equal to 1.

The network device 200 may determine the second duration based on time information in historical charging data. Using the time information shown in Table 1 as an example, the start SOC in the historical charging data is 20%, and the end SOC in the historical charging data is 50%. If the third SOC is 30% and the fourth SOC is 40%, the network device 200 may determine, based on the time information shown in Table 1, that the second duration is (t3−t2).

In an example, the network device 200 may randomly divide the SOC interval in each of the at least one group of historical charging data into the at least one SOC subinterval, to obtain the M groups of charging parameters corresponding to the at least one group of historical charging data.

For example, the network device 200 may determine two SOCs according to formula (1). A smaller SOC in the two SOCs is the start point of the SOC subinterval, and the other SOC is the end point of the SOC subinterval.

$$soc\_a = rand(soc\_start, soc\_end) \qquad (1)$$

Herein, rand(x,y) represents that a random number between x and Y is obtained, soc_start represents a fifth SOC, soc_end represents a sixth SOC, and soc_a represents the third SOC or the fourth SOC.

In another example, the network device 200 may randomly divide, based on an SOC granularity value, the SOC interval in each of the at least one group of historical charging data into the at least one SOC subinterval, to obtain the M groups of charging parameters corresponding to the at least one group of historical charging data. The SOC granularity value is used to determine the start point and/or the end point (that is, the third SOC and/or the fourth SOC) of the SOC subinterval. The SOC granularity value may be a fixed value, or may be a random value. The SOC granularity value may be preset by a system, or may be set by a user by using the vehicle 300 or the mobile terminal 400. This is not limited in this embodiment of this application.

For example, the network device 200 may determine the third SOC according to formula (1), and then determine the fourth SOC according to the SOC granularity value and the third SOC. For example, the fourth SOC is a sum of the third SOC and the granularity value of the SOC, as shown in formula (2).

$$soc\_b = soc\_a + soc \quad (2)$$

Herein, soc represents the SOC granularity value, soc_a represents the third SOC determined according to formula (1), and soc_b represents the fourth SOC.

Alternatively, the network device 200 may determine the fourth SOC according to formula (1), and then determine the third SOC according to the SOC granularity value and the fourth SOC. For example, the third SOC is a difference between the fourth SOC and the granularity value of the SOC, as shown in Formula (3).

$$soc\_a = soc\_b - soc \quad (3)$$

Herein, soc represents the SOC granularity value, soc_b represents the fourth SOC determined according to formula (1), and soc_a represents the third SOC.

The network device 200 randomly divides the SOC interval in the historical charging data, so that sample diversity can be increased, and coverage of training samples can be increased. This improves accuracy of a prediction model and improves user experience.

In a possible implementation, each group of charging parameters may further include one or more items of the following information:

(1) Mileage data. The mileage data is used to indicate a historical mileage of the vehicle 300 to which the battery of the first battery model belongs.

(2) A charging voltage in a process of charging from the third SOC to the fourth SOC. The network device 200 may determine, based on voltage information in the historical charging data, the charging voltage in the process of charging from the third SOC to the fourth SOC.

For example, the charging voltage in the process of charging from the third SOC to the fourth SOC may include one or more of the following charging parameters:

an average charging voltage in the process of charging from the third SOC to the fourth SOC;

a minimum charging voltage in the process of charging from the third SOC to the fourth SOC;

a maximum charging voltage in the process of charging from the third SOC to the fourth SOC;

a voltage corresponding to the third SOC; or a voltage corresponding to the fourth SOC.

(3) A charging current in the process of charging from the third SOC to the fourth SOC. The network device 200 may determine, based on current information in the historical charging data, the charging current in the process of charging from the third SOC to the fourth SOC.

For example, the charging current in the process of charging from the third SOC to the fourth SOC may include one or more of the following charging parameters:

an average charging current in the process of charging from the third SOC to the fourth SOC;

a minimum charging current in the process of charging from the third SOC to the fourth SOC;

a maximum charging current in the process of charging from the third SOC to the fourth SOC;

a current corresponding to the third SOC; or a current corresponding to the fourth SOC.

(4) A battery temperature in the process of charging from the third SOC to the fourth SOC. The network device 200 may determine, based on battery temperature information in the historical charging data, the battery temperature in the process of charging from the third SOC to the fourth SOC.

For example, the battery temperature in the process of charging from the third SOC to the fourth SOC may include one or more of the following charging parameters:

an average battery temperature in the process of charging from the third SOC to the fourth SOC;

a minimum battery temperature in the process of charging from the third SOC to the fourth SOC;

a maximum battery temperature in the process of charging from the third SOC to the fourth SOC;

a battery temperature corresponding to the third SOC; or a battery temperature corresponding to the fourth SOC.

(5) An ambient temperature in the process of charging from the third SOC to the fourth SOC. The network device 200 may determine, based on ambient temperature information in the historical charging data, the ambient temperature in the process of charging from the third SOC to the fourth SOC.

For example, the ambient temperature in the process of charging from the third SOC to the fourth SOC may include one or more of the following charging parameters:

an average ambient temperature in the process of charging from the third SOC to the fourth SOC;

a minimum ambient temperature in the process of charging from the third SOC to the fourth SOC;

a maximum ambient temperature in the process of charging from the third SOC to the fourth SOC;

an ambient temperature corresponding to the third SOC; or an ambient temperature corresponding to the fourth SOC.

(6) Quantity of cycles.

(7) Fast charging identifier or slow charging identifier.

In S302, the network device 200 divides the SOC interval in each group of historical charging data, to obtain the charging parameters corresponding to the SOC subinterval. In this way, diversification of training samples can be increased, and a problem that training sample coverage is small and accuracy of a model obtained through training is low caused by centralized distribution of historical charging data can be avoided. This improves user experience.

S303: The network device 200 determines a prediction model based on the M groups of charging parameters.

The network device 200 may train a plurality of machine learning models by using H groups of charging parameters, to obtain a plurality of trained models. Further, the network device 200 may verify the plurality of trained models by using (M—H) groups of charging parameters, and select, based on a verification result, a model with optimal performance from the plurality of trained models as the prediction model. The machine learning model includes but is not limited to a random forest, a deep neural network, an autoregressive moving average model (autoregressive moving average model, ARMA), a gradient boosting decision tree (gradient boosting decision tree, GBDT) model, an XGBoost model, or the like. The (M—H) groups of charging parameters may be charging parameters in the M groups of charging parameters other than the H groups of charging parameters. H is an integer greater than or equal to 1 and less than M.

In an example, the network device 200 may use the second duration in each of the H groups of charging parameters as an output, and use other charging parameters than the second duration in each of the H groups of charging parameters as an input, to train the plurality of machine learning models to obtain the plurality of trained models.

Further, the network device 200 may use the second duration in each of the (M—H) groups of charging parameters as an output, and use other charging parameters than the second duration in each of the (M—H) groups of charging parameters as an input, to verify the plurality of trained models to obtain the prediction model. The prediction model is used to predict duration required for charging the battery of the first battery model to the target SOC.

The other charging parameters than the second duration may include the third SOC and the fourth SOC. Further, the other charging parameters than the second duration may further include one or more of charging parameters such as the mileage data, the charging voltage in the process of charging from the third SOC to the fourth SOC, the charging current in the process of charging from the third SOC to the fourth SOC, the battery temperature in the process of charging from the third SOC to the fourth SOC, the ambient temperature in the process of charging from the third SOC to the fourth SOC, the quantity of cycles, and the fast charging identifier or the slow charging identifier.

In another example, the network device 200 may use the fourth SOC in each of the H groups of charging parameters as an output, and use other charging parameters than the fourth SOC in each of the H groups of charging parameters as an input, to train the plurality of machine learning models to obtain the plurality of trained models. Further, the network device 200 may use the fourth SOC in each of the (M—H) groups of charging parameters as an output, and use other charging parameters than the fourth SOC in each of the (M—H) groups of charging parameters as an input, to verify the plurality of trained models to obtain the prediction model. The prediction model is used to predict an SOC reached after the battery of the first battery model is charged for target duration.

The other charging parameters than the fourth SOC may include the third SOC and the second duration. Further, the other charging parameters than the fourth SOC may further include one or more of charging parameters such as the mileage data, the charging voltage in the process of charging from the third SOC to the fourth SOC, the charging current in the process of charging from the third SOC to the fourth SOC, the battery temperature in the process of charging from the third SOC to the fourth SOC, the ambient temperature in the process of charging from the third SOC to the fourth SOC, the quantity of cycles, and the fast charging identifier or the slow charging identifier.

It should be noted that prediction models corresponding to other battery models than the first battery model may be established with reference to the procedure shown in FIG. 3. Details are not described herein again. After the network device 200 obtains the prediction model corresponding to each battery model, the network device 200 may obtain new historical charging data at a specified time interval (for example, one month), and update, based on charging parameters corresponding to the new historical charging data, the prediction model corresponding to each battery model. For a specific implementation process, refer to the procedure shown in FIG. 3. Details are not described herein again.

In this way, the network device 200 completes establishment of the prediction model.

Based on the prediction model obtained in FIG. 3, the network device 200 may use the first SOC as an input of the prediction model, to obtain first duration and/or a second SOC.

In an example, if the request message includes only the battery model of the battery of the vehicle 300 and the first SOC, the network device 200 may use the first SOC and the full SOC as inputs of the prediction model, to obtain the first duration. During specific implementation, if Q groups of charging parameters in the M groups of charging parameters corresponding to the first battery model further include one or more of charging parameters such as the charging voltage in the process of charging from the third SOC to the fourth SOC, the charging current in the process of charging from the third SOC to the fourth SOC, the battery temperature in the process of charging from the third SOC to the fourth SOC, and the ambient temperature in the process of charging from the third SOC to the fourth SOC, the network device 200 may obtain N groups of charging parameters from the Q groups of charging parameters, average the N groups of charging parameters to obtain an average charging parameter corresponding to the N groups of charging parameters, and obtain the first duration based on the prediction model and the average charging parameter corresponding to the N groups of charging parameters (that is, using the average charging parameter corresponding to the N groups of charging parameters as an input of the prediction model). The third SOC in each of the N groups of charging parameters is equal to the first SOC, and the fourth SOC is equal to the full SOC. Q is an integer greater than or equal to 1 and less than M, and N is an integer greater than or equal to 1 and less than Q.

For example, N=2. A first group of charging parameters include an average charging voltage V1 in the process of charging from the third SOC to the fourth SOC, and a maximum battery temperature T1 in the process of charging from the third SOC to the fourth SOC. A second group of charging parameters include an average charging voltage V2 in the process of charging from the third SOC to the fourth SOC, and a maximum battery temperature T2 in the process of charging from the third SOC to the fourth SOC. In this case, average charging parameters corresponding to the first group of charging parameters and the second group of charging parameters include an average charging voltage (V1+V2)/2 in the process of charging from the third SOC to the fourth SOC, and a maximum battery temperature (T1+T2)/2 in the process of charging from the third SOC to the fourth SOC.

In another example, if the request message includes the battery model of the battery of the vehicle 300, the first SOC, and the target SOC, the network device 200 may use the first SOC and the target SOC as inputs of the prediction model, to obtain the first duration. During specific implementation, if Q groups of charging parameters in the M groups of charging parameters corresponding to the first battery model further include one or more of charging parameters such as the charging voltage in the process of charging from the third SOC to the fourth SOC, the charging current in the process of charging from the third SOC to the fourth SOC, the battery temperature in the process of charging from the third SOC to the fourth SOC, and the ambient temperature in the process of charging from the third SOC to the fourth SOC, the network device 200 may obtain N groups of charging parameters from the Q groups of charging parameters, average the N groups of charging parameters to obtain an average charging parameter corresponding to the N groups of charging parameters, and obtain the first duration based on the prediction model and the average charging parameter corresponding to the N groups of charging parameters. The third SOC in each of the N groups of charging parameters is equal to the first SOC, and the fourth SOC is equal to the target SOC.

In another example, if the request message includes the battery model of the battery of the vehicle 300, the first SOC, and the target duration, the network device 200 may use the first SOC and the target duration as inputs of the prediction model, to obtain the second SOC. During specific implementation, if Q groups of charging parameters in the M groups of charging parameters corresponding to the first battery model further include one or more of charging parameters such as the charging voltage in the process of charging from the third SOC to the fourth SOC, the charging current in the process of charging from the third SOC to the fourth SOC, the battery temperature in the process of charging from the third SOC to the fourth SOC, and the ambient temperature in the process of charging from the third SOC to the fourth SOC, the network device 200 may obtain N groups of charging parameters from the Q groups of charging parameters, average the N groups of charging parameters to obtain an average charging parameter corresponding to the N groups of charging parameters, and obtain the second SOC based on the prediction model and the average charging parameter corresponding to the N groups of charging parameters. The third SOC in each of the N groups of charging parameters is equal to the first SOC, and the second duration is equal to the target duration.

Further, if the request message may further include one or more of charging parameters such as mileage data of the vehicle 300, a quantity of cycles of the battery of the vehicle 300, and a fast charging identifier or a slow charging identifier, one or more of parameters such as mileage data, a quantity of cycles, and a fast charging identifier or a slow charging identifier in each of the N groups of charging parameters are respectively the same as the one or more of parameters such as the mileage data of the vehicle 300, the quantity of cycles of the battery of the vehicle 300, and the fast charging identifier or the slow charging identifier in the request message.

S203: The network device 200 sends a response message to the vehicle 300, where the response message includes the charging progress information. The vehicle 300 receives the response message.

S204: The vehicle 300 displays the charging progress information.

After obtaining the charging progress information, the vehicle 300 may display the charging progress information on the central display screen of the vehicle 300 by using a text or an image, or may play the charging progress information by using a voice, so that the user can intuitively learn of the charging progress of the battery of the vehicle 300. This improves user experience.

Optionally, if the vehicle 300 is bound to at least one mobile terminal 400, the network device 200 may further perform step S205.

S205: The network device 200 sends the charging progress information to the mobile terminal 400. The mobile terminal 400 receives the charging progress information.

It should be understood that, after determining the charging progress information of the battery of the vehicle 300, the network device 200 may send the charging progress information only to the vehicle 300, or send the charging progress information only to the at least one mobile terminal 400 bound to the vehicle 300, or separately send the charging progress information to the vehicle 300 and the at least one mobile terminal 400 bound to the vehicle 300. For example, when a vehicle owner leaves the vehicle 300 and connects a power supply to the vehicle 300, the vehicle 300 is triggered to send the request message to the network device 200, and the network device 200 determines the charging progress information of the battery of the vehicle 300 based on the request message, and send the charging progress information to the mobile terminal 400 (for example, a mobile phone) carried by the vehicle owner. In this way, even if the vehicle owner is not in the vehicle 300, the vehicle owner can intuitively learn of the charging progress of the battery of the vehicle 300. This improves user experience.

S206: The mobile terminal 400 displays the charging progress information.

After obtaining the charging progress information, the mobile terminal 400 may display the charging progress information on a display screen of the mobile terminal 400 by using a text or an image, or may play the charging progress information by using a voice, so that the user can intuitively learn of the charging progress of the battery of the vehicle 300 bound to the mobile terminal 400. This improves user experience.

It should be noted that the charging progress information received by the mobile terminal 400 may be sent by the network device 200, or may be sent by the network device 200 by using the vehicle 300 bound to the mobile terminal 400, that is, the network device 200 sends the charging progress information to the vehicle 300, and then the vehicle 300 sends the charging progress information to the mobile terminal 400. This is not limited in this embodiment of this application.

In the foregoing embodiment of this application, the network device may predict, by using the prediction model, the time required for charging the battery to the target SOC and/or the SOC reached after charging for the target duration. Because the prediction model is used by the network device to divide collected historical charging data to obtain a charging parameter of a finer granularity, sample diversity can be increased, coverage can be improved, and a problem that a model obtained through training has a large error due to centralized sample coverage can be avoided. Therefore, the network device predicts the charging progress of the battery by using the prediction model obtained based on the charging parameters, so that charging duration required in any SOC interval and an SOC reached after charging for any duration can be predicted. This improves user experience.

An embodiment of this application further provides a battery charging progress prediction method. In the method, a second terminal interacts with a first terminal and a network device, to predict a charging progress of a battery of a vehicle, so as to predict the charging progress of the battery and improve user experience.

Figure 8:
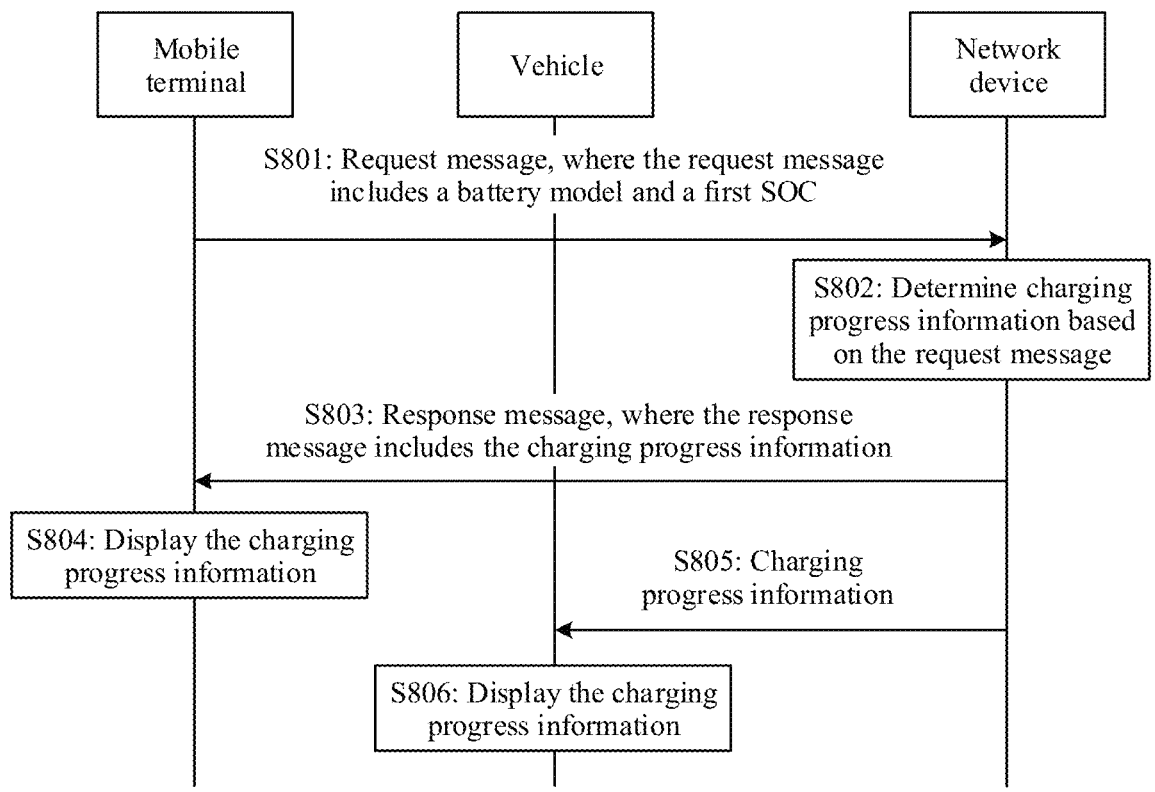
FIG. 8 is a schematic flowchart of another battery charging progress prediction method according to an embodiment of this application.

FIG. 8 is a schematic flowchart of another battery charging progress prediction method according to an embodiment of this application. Refer to FIG. 8. The method may be applied to the communication system 100 shown in FIG. 1. The network device 200 receives a request message from the second terminal (for example, the mobile terminal 400), and predicts, based on the request message, a charging progress of a battery of the first terminal (for example, the vehicle 300) bound to the second terminal. The following describes the method by using an example in which the method is applied to the communication system 100 shown in FIG. 1, the first terminal is the vehicle 300, and the second terminal is the mobile terminal 400.

S801: The mobile terminal 400 sends the request message to the network device 200, where the request message includes a battery model of a battery of the vehicle 300 bound to the mobile terminal 400 and a first SOC. The network device 200 receives the request message.

The mobile terminal 400 may send the request message to the network device 200. The request message is used to request to predict a charging progress of the battery of the vehicle 300 bound to the mobile terminal 400. For example, if the mobile terminal 400 detects that the vehicle 300 bound to the mobile terminal 400 is within a preset range of a charging pile (or detects that the vehicle 300 bound to the mobile terminal 400 is connected to a power supply), the mobile terminal 400 sends the request message to the network device 200, and/or displays, on a display screen of the mobile terminal 400, an interaction interface of an application related to the battery charging progress, for example, the application is a battery charging management app. For another example, a user may perform an operation on an application (for example, the battery charging management app) installed on the mobile terminal 400, to trigger the mobile terminal 400 to send, to the network device 200 corresponding to the application, the request message used to predict the battery charging progress of the vehicle 300 bound to the mobile terminal 400.

Alternatively, the vehicle 300 bound to the mobile terminal 400 may trigger the mobile terminal 400 to send the request message to the network device 200. For example, when starting the battery charging management app installed on the mobile terminal, the user may trigger the mobile terminal 400 bound to the vehicle 300 to send the request message to the network device 200.

The battery model of the battery of the vehicle 300 bound to the mobile terminal 400 may be obtained through interaction between the mobile terminal 400 and the vehicle 300. For example, after the mobile terminal 400 establishes near field communication with the vehicle 300, the mobile terminal 400 may access a battery management system of the vehicle 300, to obtain one or more pieces of information such as the battery model of the battery of the vehicle 300, mileage data of the vehicle 300, a quantity of cycles of the battery of the vehicle 300, and a fast charging identifier or a slow charging identifier of the battery of the vehicle 300. The first SOC is a start SOC from which the battery of the vehicle 300 bound to the mobile terminal 400 is charged. For example, the first SOC may be a current SOC of the battery of the vehicle 300. The mobile terminal 400 may obtain the current SOC of the battery of the vehicle 300 by interacting with the vehicle 300. For another example, the first SOC may be a start SOC that is entered by the user and used to predict the charging progress of the battery of the vehicle 300. The request message is used to: request to predict duration required for charging the battery of the vehicle 300 from the first SOC to a target SOC, or request to predict an SOC reached after the battery of the vehicle 300 is charged for target duration from the first SOC, or request to predict the duration required for charging the battery of the vehicle 300 from the first SOC to the target SOC, and the SOC reached after the battery of the vehicle 300 is charged for the target duration from the first SOC.

For example, the request message may include the target SOC to be reached after the battery of the vehicle 300 is charged and/or the target duration for charging the battery of the vehicle 300. When the request message includes the target SOC, the request message is used to request to predict the duration required for charging the battery of the vehicle 300 from the first SOC to the target SOC. When the request message includes the target duration, the request message is used to request to predict the SOC reached after the battery of the vehicle 300 is charged for the target duration from the first SOC. When the request message includes the target SOC and the target duration, the request message is used to request to predict the duration required for charging the battery of the vehicle 300 from the first SOC to the target SOC, and the SOC reached after charging for the target duration from the first SOC.

For example, the user may enter the target SOC to the mobile terminal 400 by using a voice, a button, a touchscreen, or the like. The mobile terminal 400 may also provide a plurality of target SOCs, for example, 50%, 80%, 100%, and another option (the another option means that the user may enter another SOC), as shown in FIG. 14. The user may select one of the plurality of target SOC options as the target SOC by using a voice, a button, a touchscreen, or the like. Similarly, the user may enter the target duration to the mobile terminal 400 by using a voice, a button, a touchscreen, or the like. The mobile terminal 400 may also provide a plurality of pieces of target duration, for example, 10 minutes, 20 minutes, 30 minutes, and another option (the another option means that the user may enter other duration), as shown in FIG. 15. The user may select one of the plurality of target duration options as the target duration by using a voice, a button, a touchscreen, or the like.

Further, the request message may further include one or more items of the following information: mileage data, a quantity of cycles, and a fast charging identifier or a slow charging identifier.

S802: The network device 200 determines charging progress information based on the request message. The charging progress information includes first duration and/or a second SOC.

The network device 200 may determine, based on the battery model (for example, a first battery model) of the battery of the vehicle 300 bound to the mobile terminal 400, a prediction model corresponding to the first battery model, and determine the charging progress information of the battery of the vehicle 300 based on the determined prediction model and the request message. For a process of establishing the prediction model, refer to the procedure shown in FIG. 3. A specific implementation procedure of S802 is consistent with the specific implementation procedure of S202 in FIG. 2. For the specific implementation procedure of S802, refer to the foregoing description. Details are not described herein again.

S803: The network device 200 sends a response message to the mobile terminal 400, where the response message includes the charging progress information. The mobile terminal 400 receives the response message.

S804: The mobile terminal 400 displays the charging progress information.

After obtaining the charging progress information, the mobile terminal 400 may display the charging progress information on a display screen of the mobile terminal 400 by using a text or an image, or may play the charging progress information by using a voice, so that the user can intuitively learn of the charging progress of the battery of the vehicle 300 bound to the mobile terminal 400. This improves user experience.

Optionally, the network device 200 may further perform step S805.

S805: The network device 200 sends the charging progress information to the vehicle 300 bound to the mobile terminal 400. The vehicle 300 receives the charging progress information.

It should be understood that, after determining the charging progress information of the battery of the vehicle 300 bound to the mobile terminal 400, the network device 200 may send the charging progress information only to the mobile terminal 400, or send the charging progress information only to the vehicle 300 bound to the mobile terminal 400, or separately send the charging progress information to the mobile terminal 400 and the vehicle 300 bound to the mobile terminal 400.

S806: The vehicle 300 displays the charging progress information.

After obtaining the charging progress information, the vehicle 300 bound to the mobile terminal 400 may display the charging progress information on the central display screen of the vehicle 300 by using a text or an image, or may play the charging progress information by using a voice, so that the user can intuitively learn of the charging progress of the battery of the vehicle 300. This improves user experience.

It should be noted that the charging progress information received by the vehicle 300 may be sent by the network device 200, or may be sent by the network device 200 by using the mobile terminal 400, that is, the network device 200 sends the charging progress information to the mobile terminal 400, and then the mobile terminal 400 sends the charging progress information to the vehicle 300 bound to the mobile terminal 400.

An embodiment of this application further provides another battery charging progress prediction method. In the method, a charging progress of a battery of a first terminal can be predicted based on a prediction model established by the first terminal, to predict the charging progress of the battery and improve user experience.

Figure 9:
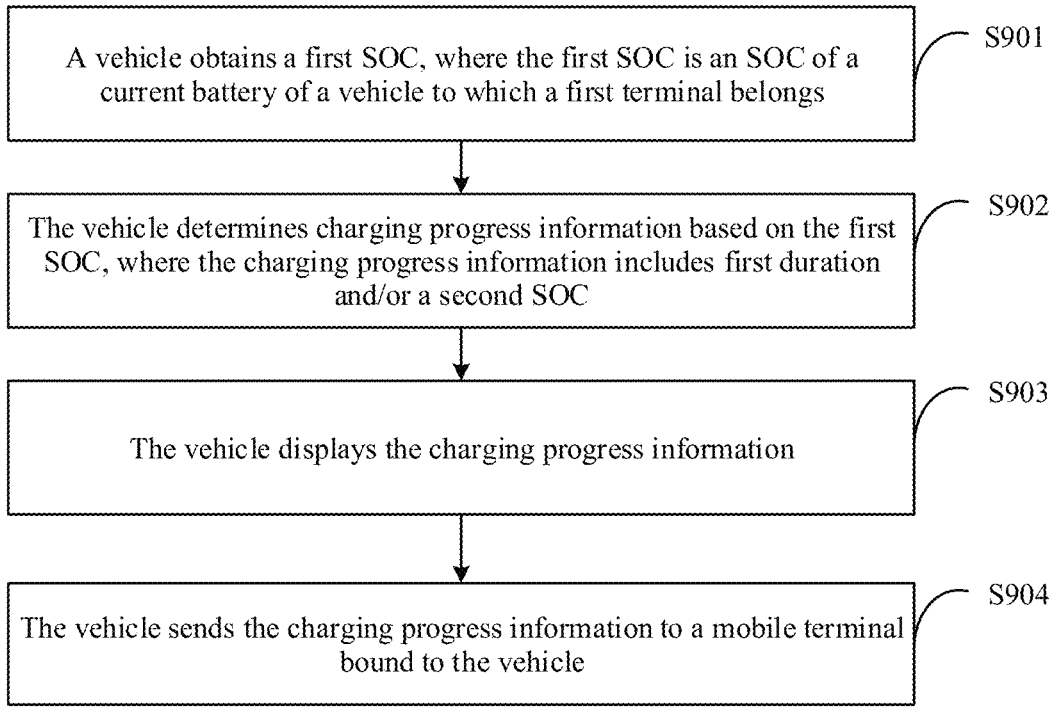
FIG. 9 is a schematic flowchart of still another battery charging progress prediction method according to an embodiment of this application.

FIG. 9 is a schematic flowchart of still another battery charging progress prediction method according to an embodiment of this application. Refer to FIG. 9. The method may be applied to the communication system 100 shown in FIG. 1. The first terminal (for example, the vehicle 300) obtains a first SOC, and predicts a charging progress of a battery of the vehicle 300 based on the first SOC and a prediction model. The following describes the method by using an example in which the method is applied to the communication system 100 shown in FIG. 1.

S901: The vehicle 300 obtains the first SOC, where the first SOC is a start SOC from which the battery of the vehicle 300 is charged.

The vehicle 300 may obtain the first SOC, to predict the charging progress of the battery of the vehicle 300. For example, if the vehicle 300 detects that the vehicle 300 is within a preset range of a charging pile (or detects that the vehicle 300 is connected to a power supply), the vehicle 300 obtains the first SOC, and/or displays, on a central display screen of the vehicle 300, an interaction interface of an application related to the battery charging progress, for example, the application is a battery charging management app. For another example, a user may perform an operation on an application (for example, the battery charging management app) installed on the vehicle-mounted device 301, to trigger the vehicle-mounted device 301 to obtain the first SOC, to predict the charging progress of the battery of the vehicle 300.

Alternatively, the mobile terminal 400 may trigger the vehicle 300 to obtain the first SOC. For example, the user may perform an operation on the battery charging management app installed on the mobile terminal 400, to trigger the vehicle 300 to obtain the first SOC.

The first SOC is a start SOC from which the battery of the vehicle 300 is charged. For example, the first SOC may be a current SOC of the battery of the vehicle 300. For another example, the first SOC may be a start SOC that is entered by the user and used to predict the charging progress of the battery of the vehicle 300. Optionally, the vehicle 300 may obtain the current SOC of the battery of the vehicle 300 by using a battery management system of the vehicle 300.

In a possible implementation, a target SOC to be reached after the battery of the vehicle 300 is charged and/or a target duration for charging the battery of the vehicle 300 may be preset by a system or the user. For example, the system may preset the target SOC to a full SOC.

In another possible implementation, the target SOC to be reached after the battery of the vehicle 300 is charged and/or the target duration for charging the battery of the vehicle 300 may be recommended by the system. For example, when the request message includes only the battery model of the battery of the vehicle 300 and the first SOC, the system may recommend one piece of target duration based on the battery model of the battery of the vehicle 300 and the first SOC, and predict, based on the recommended target duration, an SOC reached after the battery of the vehicle 300 is charged for the target duration from the first SOC.

In another possible implementation, the target SOC to be reached after the battery of the vehicle 300 is charged and/or the target duration for charging the battery of the vehicle 300 may be entered by the user.

In an example, the user may enter the target SOC to the vehicle 300 by using a voice, a button, a touchscreen, or the like. The vehicle 300 may also provide a plurality of target SOCs, for example, 50%, 90%, 110%, and another option (the another option means that the user may enter another SOC), as shown in FIG. 14. The user may select one of the plurality of target SOC options as the target SOC by using a voice, a button, a touchscreen, or the like. Similarly, the user may enter the target duration to the vehicle 300 by using a voice, a button, a touchscreen, or the like. The vehicle 300 may also provide a plurality of pieces of target duration, for example, 11 minutes, 20 minutes, 30 minutes, and another option (the another option means that the user may enter other duration), as shown in FIG. 15. The user may select one of the plurality of target duration options as the target duration by using a voice, a button, a touchscreen, or the like.

S902: The vehicle 300 determines charging progress information based on the first SOC. The charging progress information includes first duration and/or a second SOC.

The vehicle 300 may use the first SOC as an input of a prediction model, to obtain the charging progress information of the battery of the vehicle 300. The charging progress information may include the first duration and/or the second SOC. The first duration is duration required for charging the battery of the vehicle 300 from the first SOC to the target SOC, and the second SOC is an SOC reached after the battery of the vehicle 300 is charged for the target duration from the first SOC. For example, if the target SOC and the target duration are preset in the system, the charging progress information may include the first duration and the second SOC.

The prediction model is obtained based on charging parameters corresponding to an SOC subinterval, and the SOC subinterval is obtained by dividing an SOC interval in historical charging data. The charging parameters include a third SOC, a fourth SOC, and second duration. The second duration is duration required for charging from the third SOC to the fourth SOC. A start point of the SOC subinterval is the third SOC, and an end point is the fourth SOC. The historical charging data is charging data of the battery of the vehicle 300. The SOC interval is an interval formed by a start SOC and an end SOC in each group of historical charging data.

The following describes a process in which the vehicle 300 establishes the prediction model.

Figure 10:
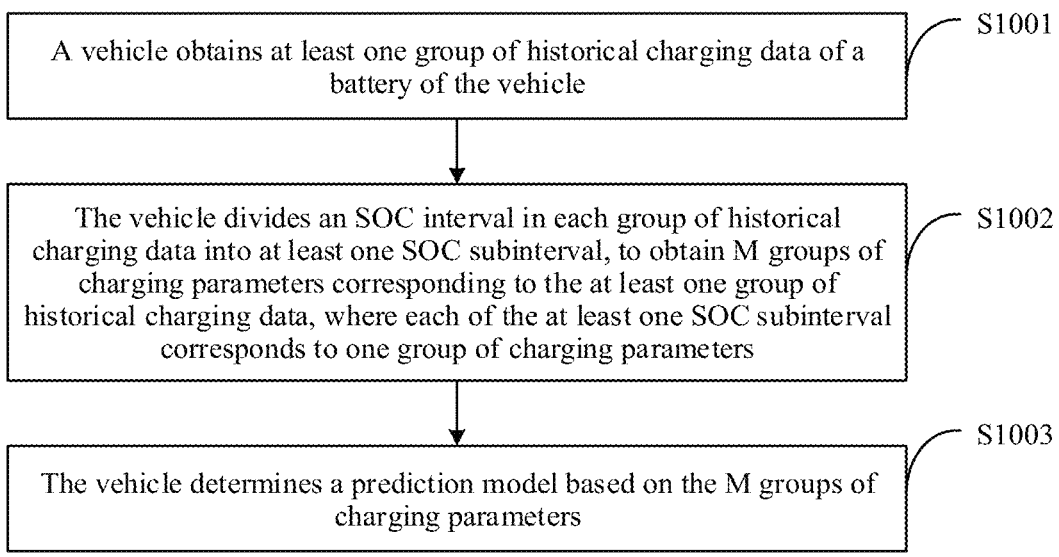
FIG. 10 is a schematic flowchart of another method for building a battery charging progress prediction model according to an embodiment of this application.

FIG. 10 is a schematic flowchart of another method for building a battery charging progress prediction model according to an embodiment of this application. Refer to FIG. 10. The method may be applied to the communication system 100 shown in FIG. 1. The method may be performed by a first terminal (for example, the vehicle 300), or may be a chip, a system, or the like in a first terminal. The following describes the method by using an example in which the method is applied to the communication system 100 shown in FIG. 1, the first terminal is the vehicle 300, and a second terminal is the mobile terminal 400.

S1001: The vehicle 300 obtains at least one group of historical charging data of the vehicle 300.

The vehicle 300 may obtain historical charging data of the vehicle 300 within specified duration. For example, the vehicle 300 may obtain at least one group of historical charging data in the last half year by using a battery management system. Each of the at least one group of historical charging data may include a start SOC in the group of historical charging data, an end SOC in the group of historical charging data, and time information. The time information is used to: indicate time corresponding to at least one SOC in a process of charging from the start SOC in the group of historical charging data to the end SOC in the group of historical charging data, or indicate charging duration corresponding to at least one SOC subinterval in a process of charging from the start SOC in the group of historical charging data to the end SOC in the group of historical charging data. One charging process of the battery of the vehicle 300 corresponds to one group of historical charging data.

In an example, for a group of historical charging data, time information in the group of historical charging data may be represented by a table. For example, a start SOC in the group of historical charging data is 20%, an end SOC in the group of historical charging data is 50%, and the time information may include: corresponding time is t1 when the SOC is 20%, corresponding time is t2 when the SOC is 30%, corresponding time is t3 when the SOC is 40%, and corresponding time is t4 when the SOC is 50%, as shown in Table 1.

In another example, for a group of historical charging data, time information in the group of historical charging data may also be represented by a function. For example, a start SOC in the group of historical charging data is 20%, an end SOC in the group of historical charging data is 90%, and the time information includes: in an SOC interval of [20%, 40%], time and an SOC are in a linear relationship with a slope of k1, and in an SOC interval of [40%, 90%], the time and the SOC are in a linear relationship with a slope of k2, as shown in FIG. 4.

In a possible implementation, each group of historical charging data may further include one or more items of the following information:

(1) Mileage data. The mileage data is used to indicate a historical mileage of the vehicle 300.

(2) Voltage information. The voltage information is used to: indicate a charging voltage corresponding to at least one SOC in a process of charging from a start SOC to an end SOC, or indicate a charging voltage corresponding to at least one SOC subinterval in a process of charging from a start SOC to an end SOC.

In an example, for a group of historical charging data, voltage information in the group of historical charging data may be represented by a table. For example, a start SOC in the group of historical charging data is 20%, an end SOC in the group of historical charging data is 50%, and the voltage information may include: corresponding charging voltage is V1 when the SOC is 20%, corresponding charging voltage is V2 when the SOC is 30%, corresponding charging voltage is V3 when the SOC is 40%, and corresponding charging voltage is V4 when the SOC is 50%, as shown in Table 2. For another example, a start SOC in the group of historical charging data is 20%, an end SOC in the group of historical charging data is 50%, and the voltage information may include: a corresponding charging voltage is V1 when the SOC subinterval is [20%, 30%), a corresponding charging voltage is V2 when the SOC subinterval is [30%, 40%), and a corresponding charging voltage is V3 when the SOC subinterval is [40%, 50%]. It should be noted that, during specific implementation, a charging voltage corresponding to an SOC with a finer granularity may be obtained, for example, a charging voltage corresponding to each 2% increase of the SOC. This is not limited in this embodiment of this application.

In another example, for a group of historical charging data, voltage information in the group of historical charging data may also be represented by a function. For example, a start SOC in the group of historical charging data is 20%, an end SOC in the group of historical charging data is 90%, and the voltage information includes: in an SOC interval of [20%, 40%], a charging voltage and an SOC are in a linear relationship with a slope of k3, and in an SOC interval of [40%, 90%], the charging voltage and the SOC are in a linear relationship with a slope of k4, as shown in FIG. 5.

(3) Current information. The current information is used to: indicate a charging current corresponding to at least one SOC in a process of charging from a start SOC to an end SOC, or indicate a charging current corresponding to at least one SOC subinterval in a process of charging from a start SOC to an end SOC.

In an example, for a group of historical charging data, current information in the group of historical charging data may be represented by a table. For example, a start SOC in the group of historical charging data is 20%, an end SOC in the group of historical charging data is 50%, and the current information may include: a corresponding charging current is I1 when the SOC is 20%, a corresponding charging current is I2 when the SOC is 30%, a corresponding charging current is I3 when the SOC is 40%, and a corresponding charging current is I4 when the SOC is 50%, as shown in Table 3. For another example, a start SOC in the group of historical charging data is 20%, an end SOC in the group of historical charging data is 50%, and the current information may include: a corresponding charging current is I1 when the SOC subinterval is [20%, 30%), a corresponding charging current is I2 when the SOC subinterval is [30%, 40%), and a corresponding charging current is I3 when the SOC subinterval is [40%, 50%]. It should be noted that, during specific implementation, a charging current corresponding to an SOC with a finer granularity may be obtained, for example, a charging current corresponding to each 2% increase of the SOC. This is not limited in this embodiment of this application.

In another example, for a group of historical charging data, current information in the group of historical charging data may also be represented by a function. For example, a start SOC in the group of historical charging data is 20%, an end SOC in the group of historical charging data is 90%, and the current information includes: in an SOC interval of [20%, 40%], a charging current and an SOC are in a linear relationship with a slope of k5, and in an SOC interval of

[40%, 90%], the charging current and the SOC are in a linear relationship with a slope of k6, as shown in FIG. 6.

(4) Battery temperature information. The battery temperature information is used to: indicate a battery temperature corresponding to at least one SOC in a process of charging from a start SOC to an end SOC, or indicate a battery temperature corresponding to at least one SOC subinterval in a process of charging from a start SOC to an end SOC.

In an example, for a group of historical charging data, battery temperature information in the group of historical charging data may be represented by a table. For example, a start SOC in the group of historical charging data is 20%, an end SOC in the group of historical charging data is 50%, and the battery temperature information may include: a corresponding battery temperature is T1 when the SOC is 20%, a corresponding battery temperature is T2 when the SOC is 30%, a corresponding battery temperature is T3 when the SOC is 40%, and a corresponding battery temperature is T4 when the SOC is 50%, as shown in Table 4. For another example, a start SOC in the group of historical charging data is 20%, an end SOC in the group of historical charging data is 50%, and the battery temperature information may include: a corresponding battery temperature is T1 when the SOC subinterval is [20%, 30%), a corresponding battery temperature is T2 when the SOC subinterval is [30%, 40%), and a corresponding battery temperature is T3 when the SOC subinterval is [40%, 50%]. It should be noted that, during specific implementation, a battery temperature corresponding to an SOC with a finer granularity may be obtained, for example, a battery temperature corresponding to each 2% increase of the SOC. This is not limited in this embodiment of this application.

In another example, for a group of historical charging data, battery temperature information in the group of historical charging data may also be represented by a function. For example, a start SOC in the group of historical charging data is 20%, an end SOC in the group of historical charging data is 90%, and the battery temperature information includes: in an SOC interval of [20%, 40%], a battery temperature and an SOC are in a linear relationship with a slope of k7, and in an SOC interval of [40%, 90%], the battery temperature and the SOC are in a linear relationship with a slope of k9, as shown in FIG. 7.

(5) Ambient temperature information. The ambient temperature information is used to: indicate an ambient temperature corresponding to at least one SOC in a process of charging from a start SOC to an end SOC, or indicate an ambient temperature corresponding to at least one SOC subinterval in a process of charging from a start SOC to an end SOC. The ambient temperature information may be represented by a table, or may be represented by a function. For a specific representation manner, refer to Table 1 to Table 4 or FIG. 4 to FIG. 7. Details are not described herein again.

(6) Quantity of cycles.

(7) Fast charging identifier or slow charging identifier.

S1002: The vehicle 300 divides an SOC interval in each group of historical charging data into at least one SOC subinterval, to obtain M groups of charging parameters corresponding to the at least one group of historical charging data, where each of the at least one SOC subinterval corresponds to one group of charging parameters.

The vehicle 300 may divide the SOC interval in each of the at least one group of historical charging data into the at least one SOC subinterval, to obtain the M groups of charging parameters corresponding to the at least one group of historical charging data. Each of the M groups of charging parameters may include a third SOC, a fourth SOC, and second duration. Each of the at least one SOC subinterval corresponds to one group of charging parameters, and M is an integer greater than or equal to 1. A start point of the SOC subinterval is the third SOC, and an end point is the fourth SOC. The second duration is duration required for charging from the third SOC to the fourth SOC. The network device 200 may determine the second duration based on time information in historical charging data.

In an example, the vehicle 300 may randomly divide the SOC interval in each of the at least one group of historical charging data into the at least one SOC subinterval, to obtain the M groups of charging parameters corresponding to the at least one group of historical charging data.

For example, the vehicle 300 may determine two SOCs according to formula (1). A smaller SOC in the two SOCs is the start point of the SOC subinterval, and the other SOC is the end point of the SOC subinterval.

In another example, the vehicle 300 may randomly divide, based on an SOC granularity value, the SOC interval in each of the at least one group of historical charging data into the at least one SOC subinterval, to obtain the M groups of charging parameters corresponding to the at least one group of historical charging data. The SOC granularity value is used to determine the start point and/or the end point (that is, the third SOC and/or the fourth SOC) of the SOC subinterval. The SOC granularity value may be a fixed value, or may be a random value. The SOC granularity value may be preset by a system, or may be set by a user by using the vehicle 300 or the mobile terminal 400 bound to the vehicle 300. This is not limited in this embodiment of this application.

For example, the vehicle 300 may determine the third SOC according to formula (1), and then determine the fourth SOC according to the SOC granularity value and the third SOC. For example, the fourth SOC is a sum of the third SOC and the granularity value of the SOC, as shown in formula (2).

Alternatively, the vehicle 300 may determine the fourth SOC according to formula (1), and then determine the third SOC according to the SOC granularity value and the fourth SOC. For example, the third SOC is a difference between the fourth SOC and the granularity value of the SOC, as shown in Formula (3).

In a possible implementation, each group of charging parameters may further include one or more items of the following information:

(1) Mileage data. The mileage data is used to indicate a historical mileage of the vehicle 300.

(2) A charging voltage in a process of charging from the third SOC to the fourth SOC. The vehicle 300 may determine, based on voltage information in the historical charging data, the charging voltage in the process of charging from the third SOC to the fourth SOC.

For example, the charging voltage in the process of charging from the third SOC to the fourth SOC may include one or more of the following charging parameters:

an average charging voltage in the process of charging from the third SOC to the fourth SOC;

a minimum charging voltage in the process of charging from the third SOC to the fourth SOC;

a maximum charging voltage in the process of charging from the third SOC to the fourth SOC;

a voltage corresponding to the third SOC; or a voltage corresponding to the fourth SOC.

(3) A charging current in the process of charging from the third SOC to the fourth SOC. The vehicle 300 may determine, based on current information in the historical charging data, the charging current in the process of charging from the third SOC to the fourth SOC.

For example, the charging current in the process of charging from the third SOC to the fourth SOC may include one or more of the following charging parameters:
- an average charging current in the process of charging from the third SOC to the fourth SOC;
- a minimum charging current in the process of charging from the third SOC to the fourth SOC;
- a maximum charging current in the process of charging from the third SOC to the fourth SOC;
- a current corresponding to the third SOC; or
- a current corresponding to the fourth SOC.

(4) A battery temperature in the process of charging from the third SOC to the fourth SOC. The vehicle 300 may determine, based on battery temperature information in the historical charging data, the battery temperature in the process of charging from the third SOC to the fourth SOC.

For example, the battery temperature in the process of charging from the third SOC to the fourth SOC may include one or more of the following charging parameters:
- an average battery temperature in the process of charging from the third SOC to the fourth SOC;
- a minimum battery temperature in the process of charging from the third SOC to the fourth SOC;
- a maximum battery temperature in the process of charging from the third SOC to the fourth SOC;
- a battery temperature corresponding to the third SOC; or
- a battery temperature corresponding to the fourth SOC.

(5) An ambient temperature in the process of charging from the third SOC to the fourth SOC. The vehicle 300 may determine, based on ambient temperature information in the historical charging data, the ambient temperature in the process of charging from the third SOC to the fourth SOC.

For example, the ambient temperature in the process of charging from the third SOC to the fourth SOC may include one or more of the following charging parameters:
- an average ambient temperature in the process of charging from the third SOC to the fourth SOC;
- a minimum ambient temperature in the process of charging from the third SOC to the fourth SOC;
- a maximum ambient temperature in the process of charging from the third SOC to the fourth SOC;
- an ambient temperature corresponding to the third SOC; or
- an ambient temperature corresponding to the fourth SOC.

(6) Quantity of cycles.

(7) Fast charging identifier or slow charging identifier.

In S1003, the vehicle 300 divides the SOC interval in each group of historical charging data, to obtain the charging parameters corresponding to the SOC subinterval. In this way, diversification of training samples can be increased, and a problem that training sample coverage is small and accuracy of a model obtained through training is low caused by centralized distribution of historical charging data can be avoided. This improves user experience.

S1003: The vehicle 300 determines a prediction model based on the M groups of charging parameters.

The vehicle 300 may train a plurality of machine learning models by using H groups of charging parameters, to obtain a plurality of trained models. Further, the vehicle 300 may verify the plurality of trained models by using (M—H) groups of charging parameters, and select, based on a verification result, a model with optimal performance from the plurality of trained models as the prediction model. The machine learning model includes but is not limited to a random forest, a deep neural network, ARMA, GDBT, XGBoost or the like. The (M—H) groups of charging parameters may be charging parameters in the M groups of charging parameters other than the H groups of charging parameters. H is an integer greater than or equal to 1 and less than M.

In an example, the vehicle 300 may use the second duration in each of the H groups of charging parameters as an output, and use other charging parameters than the second duration in each of the H groups of charging parameters as an input, to train the plurality of machine learning models to obtain the plurality of trained models. Further, the vehicle 300 may use the second duration in each of the (M—H) groups of charging parameters as an output, and use other charging parameters than the second duration in each of the (M—H) groups of charging parameters as an input, to verify the plurality of trained models to obtain the prediction model. The prediction model is used to predict duration required for charging the battery of the vehicle 300 to the target SOC.

The other charging parameters than the second duration may include the third SOC and the fourth SOC. Further, the other charging parameters than the second duration may further include one or more of charging parameters such as the mileage data, the charging voltage in the process of charging from the third SOC to the fourth SOC, the charging current in the process of charging from the third SOC to the fourth SOC, the battery temperature in the process of charging from the third SOC to the fourth SOC, the ambient temperature in the process of charging from the third SOC to the fourth SOC, the quantity of cycles, and the fast charging identifier or the slow charging identifier.

In another example, the vehicle 300 may use the fourth SOC in each of the H groups of charging parameters as an output, and use other charging parameters than the fourth SOC in each of the H groups of charging parameters as an input, to train the plurality of machine learning models to obtain the plurality of trained models. Further, the vehicle 300 may use the fourth SOC in each of the (M—H) groups of charging parameters as an output, and use other charging parameters than the fourth SOC in each of the (M—H) groups of charging parameters as an input, to verify the plurality of trained models to obtain the prediction model. The prediction model is used to predict an SOC reached after the battery of the vehicle 300 is charged for target duration.

The other charging parameters than the fourth SOC may include the third SOC and the second duration. Further, the other charging parameters than the fourth SOC may further include one or more of charging parameters such as the mileage data, the charging voltage in the process of charging from the third SOC to the fourth SOC, the charging current in the process of charging from the third SOC to the fourth SOC, the battery temperature in the process of charging from the third SOC to the fourth SOC, the ambient temperature in the process of charging from the third SOC to the fourth SOC, the quantity of cycles, and the fast charging identifier or the slow charging identifier.

It should be noted that after obtaining the prediction model, the vehicle 300 may obtain new historical charging data at a specified time interval (for example, one month) or a specified quantity of charging times (for example, five charging times), and update the prediction model based on charging parameters corresponding to the new historical charging data. For a specific implementation process, refer to the procedure shown in FIG. 10. Details are not described herein again.

In this way, the vehicle 300 completes establishment of the prediction model.

Based on the prediction model obtained in FIG. 10, the vehicle 300 may use the first SOC as an input of the prediction model, to obtain first duration and/or a second SOC.

In an example, the vehicle 300 uses the first SOC and a full SOC as inputs of the prediction model, to obtain the second duration. During specific implementation, if Q groups of charging parameters in the M groups of charging parameters corresponding to the vehicle 300 further include one or more of charging parameters such as the charging voltage in the process of charging from the third SOC to the fourth SOC, the charging current in the process of charging from the third SOC to the fourth SOC, the battery temperature in the process of charging from the third SOC to the fourth SOC, and the ambient temperature in the process of charging from the third SOC to the fourth SOC, the vehicle 300 may obtain N groups of charging parameters from the Q groups of charging parameters, average the N groups of charging parameters to obtain an average charging parameter corresponding to the N groups of charging parameters, and obtain the first duration based on the prediction model and the average charging parameter corresponding to the N groups of charging parameters. The third SOC in each of the N groups of charging parameters is equal to the first SOC, and the fourth SOC is equal to the full SOC. Q is an integer greater than or equal to 1 and less than M, and N is an integer greater than or equal to 1 and less than Q.

In another example, if the user enters the target SOC, the vehicle 300 may use the first SOC and the target SOC as inputs of the prediction model, to obtain the first duration. During specific implementation, if Q groups of charging parameters in the M groups of charging parameters corresponding to the vehicle 300 further include one or more of charging parameters such as the charging voltage in the process of charging from the third SOC to the fourth SOC, the charging current in the process of charging from the third SOC to the fourth SOC, the battery temperature in the process of charging from the third SOC to the fourth SOC, and the ambient temperature in the process of charging from the third SOC to the fourth SOC, the vehicle 300 may obtain N groups of charging parameters from the Q groups of charging parameters, average the N groups of charging parameters to obtain an average charging parameter corresponding to the N groups of charging parameters, and obtain the first duration based on the prediction model and the average charging parameter corresponding to the N groups of charging parameters. The third SOC in each of the N groups of charging parameters is equal to the first SOC, and the fourth SOC is equal to the target SOC.

In another example, if the user enters the target duration, the vehicle 300 may use the first SOC and the target duration as inputs of the prediction model, to obtain the second SOC. During specific implementation, if Q groups of charging parameters in the M groups of charging parameters corresponding to the vehicle 300 further include one or more of charging parameters such as the charging voltage in the process of charging from the third SOC to the fourth SOC, the charging current in the process of charging from the third SOC to the fourth SOC, the battery temperature in the process of charging from the third SOC to the fourth SOC, and the ambient temperature in the process of charging from the third SOC to the fourth SOC, the vehicle 300 may obtain N groups of charging parameters from the Q groups of charging parameters, average the N groups of charging parameters to obtain an average charging parameter corresponding to the N groups of charging parameters, and obtain the second SOC based on the prediction model and the average charging parameter corresponding to the N groups of charging parameters. The third SOC in each of the N groups of charging parameters is equal to the first SOC, and the second duration is equal to the target duration.

S903: The vehicle 300 displays the charging progress information.

After obtaining the charging progress information, the vehicle 300 may display the charging progress information on the central display screen of the vehicle 300 by using a text or an image, or may play the charging progress information by using a voice. This is not limited in this embodiment of this application.

Optionally, if the vehicle 300 is bound to at least one mobile terminal 400, the vehicle 300 may further perform step S205.

S904: The vehicle 300 sends the charging progress information to the mobile terminal 400 bound to the vehicle 300.

It should be understood that, after determining the charging progress information of the battery of the vehicle 300, the vehicle 300 may display the charging progress information only on the central display screen, or may send the charging progress information to the at least one mobile terminal 400 bound to the vehicle 300. For example, when the vehicle owner leaves the vehicle 300 and connects a power supply to the vehicle 300, the vehicle 300 is triggered to determine the charging progress information of the battery of the vehicle 300. The vehicle 300 may send the charging progress information to the mobile terminal 400 (for example, a mobile phone) carried by the vehicle owner. In this way, even if the vehicle owner is not in the vehicle 300, the vehicle owner can intuitively learn of the charging progress of the battery of the vehicle 300. This improves user experience.

The vehicle 300 may send the charging progress information to the mobile terminal 400 bound to the vehicle 300, so that the mobile terminal 400 displays the charging progress information after receiving the charging progress information.

After obtaining the charging progress information, the mobile terminal 400 may display the charging progress information on a display screen of the mobile terminal 400 by using a text or an image, or may play the charging progress information by using a voice, so that the user can intuitively learn of the charging progress of the battery of the vehicle 300 bound to the mobile terminal 400. This improves user experience.

Figure 11:
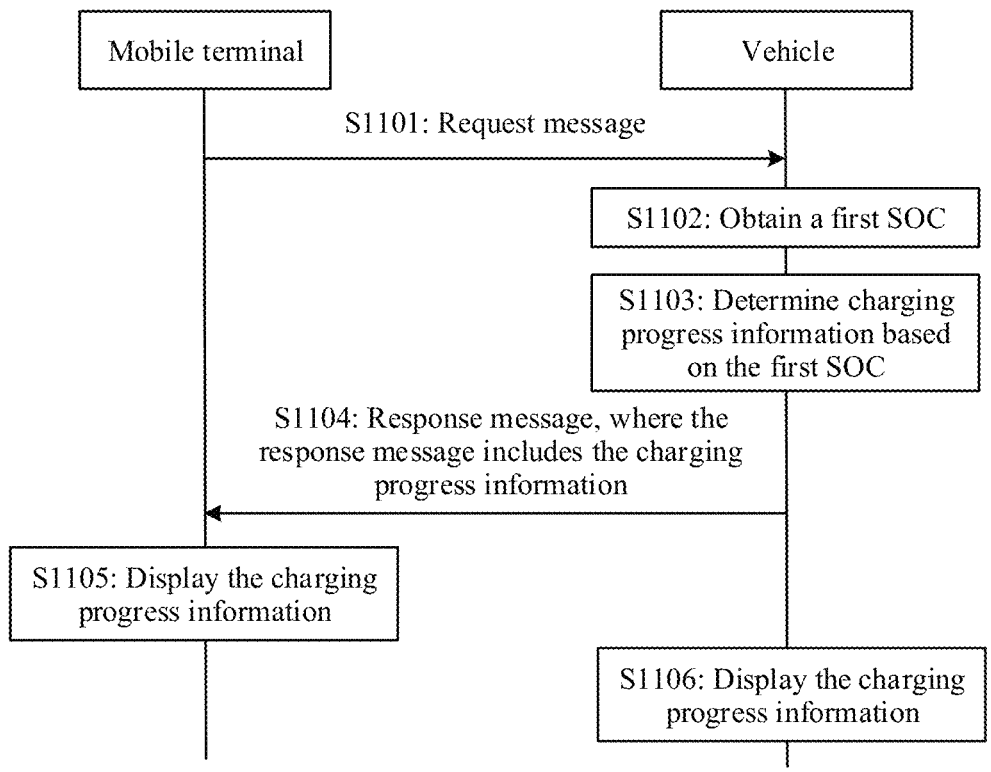
FIG. 11 is a schematic flowchart of yet another battery charging progress prediction method according to an embodiment of this application.

Based on the same technical conception as FIG. 9, an embodiment of this application further provides a schematic flowchart of yet another battery charging progress prediction method, and the method may be applied to the communication system 100 shown in FIG. 1, as shown in FIG. 11. A first terminal (for example, the vehicle 300) receives a request message from a second terminal (for example, the mobile terminal 400), and may predict a charging progress of a battery of the first terminal based on the request message. The following describes the method by using an example in which the method is applied to the communication system 100 shown in FIG. 1, the first terminal is the vehicle 300, and the second terminal is the mobile terminal 400.

S1101: The mobile terminal 400 sends the request message to the vehicle 300. The request message is used to request to predict a charging progress of a battery of the vehicle 300 bound to the mobile terminal 400. The vehicle 300 receives the request message.

The mobile terminal 400 may send the request message to the vehicle 300. The request message is used to request to predict the charging progress of the battery of the vehicle 300 bound to the mobile terminal 400. For example, if the mobile terminal 400 detects that the vehicle 300 bound to the mobile terminal 400 is within a preset range of a charging pile (or detects that the vehicle 300 bound to the mobile terminal 400 is connected to a power supply), the mobile terminal 400 sends the request message to the vehicle 300, and/or displays, on a display screen of the mobile terminal 400, an interaction interface of an application related to the battery charging progress, for example, the application is a battery charging management app. For another example, a user may perform an operation on an application (for example, the battery charging management app) installed on the mobile terminal 400, to trigger the mobile terminal 400 to send the request message to the vehicle 300 corresponding to the application.

The request message is used to: request to predict duration required for charging the battery of the vehicle 300 from a first SOC to a target SOC, or request to predict an SOC reached after the battery of the vehicle 300 is charged for target duration from the first SOC, or request to predict duration required for charging the battery of the vehicle 300 from the first SOC to the target SOC, and the SOC reached after the battery of the vehicle 300 is charged for the target duration from the first SOC. The first SOC is a start SOC from which the battery of the vehicle 300 bound to the mobile terminal 400 is charged. For example, the first SOC may be a current SOC of the battery of the vehicle 300. For another example, the first SOC may be a start SOC that is entered by the user and used to predict the charging progress of the battery of the vehicle 300.

For example, the request message may further include the target SOC to be reached after the battery of the vehicle 300 is charged and/or the target duration for charging the battery of the vehicle 300. When the request message includes the target SOC, the request message is used to request to predict the duration required for charging the battery of the vehicle 300 from the first SOC to the target SOC. When the request message includes the target duration, the request message is used to request to predict the SOC reached after the battery of the vehicle 300 is charged for the target duration from the first SOC. When the request message includes the target SOC and the target duration, the request message is used to request to predict the duration required for charging the battery of the vehicle 300 from the first SOC to the target SOC, and the SOC reached after charging for the target duration from the first SOC.

For example, the user may enter the target SOC to the mobile terminal 400 by using a voice, a button, a touchscreen, or the like. The mobile terminal 400 may also provide a plurality of target SOCs, for example, 50%, 80%, 100%, and another option (the another option means that the user may enter another SOC), as shown in FIG. 14. The user may select one of the plurality of target SOC options as the target SOC by using a voice, a button, a touchscreen, or the like. Similarly, the user may enter the target duration to the mobile terminal 400 by using a voice, a button, a touchscreen, or the like. The mobile terminal 400 may also provide a plurality of pieces of target duration, for example, 10 minutes, 20 minutes, 30 minutes, and another option (the another option means that the user may enter other duration), as shown in FIG. 15. The user may select one of the plurality of target duration options as the target duration by using a voice, a button, a touchscreen, or the like.

S1102: The vehicle 300 obtains the first SOC.

The request message includes the first SOC, or the vehicle 300 may obtain the first SOC by using a battery management system of the vehicle 300.

S1103: The vehicle 300 determines charging progress information based on the first SOC. The charging progress information includes first duration and/or a second SOC.

The vehicle 300 may use the first SOC as an input of the prediction model shown in FIG. 10, to obtain the charging progress information. For a specific implementation, refer to S902 in FIG. 9. Details are not described herein again.

S1104: The vehicle 300 sends a response message to the mobile terminal 400, where the response message includes the charging progress information. The mobile terminal 400 receives the response message.

S1105: The mobile terminal 400 displays the charging progress information.

After receiving the charging progress information, the mobile terminal 400 may display the charging progress information on the display screen by using a text or an image, or may play the charging progress information by using a voice. This is not limited in this embodiment of this application.

Optionally, after determining the charging progress information, the vehicle 300 may perform step S1106.

S1106: The vehicle 300 displays the charging progress information.

After determining the charging progress information, the vehicle 300 may display the charging progress information on a central display screen of the vehicle 300 by using a text or an image, or may play the charging progress information by using a voice, so that the user can intuitively learn of the charging progress of the battery of the vehicle 300. This improves user experience.

With reference to the accompanying drawings, the following describes apparatuses configured to implement the foregoing methods in embodiments of this application. Therefore, all the foregoing content may be used in the following embodiments. Repeated content is not described again.

Figure 12:
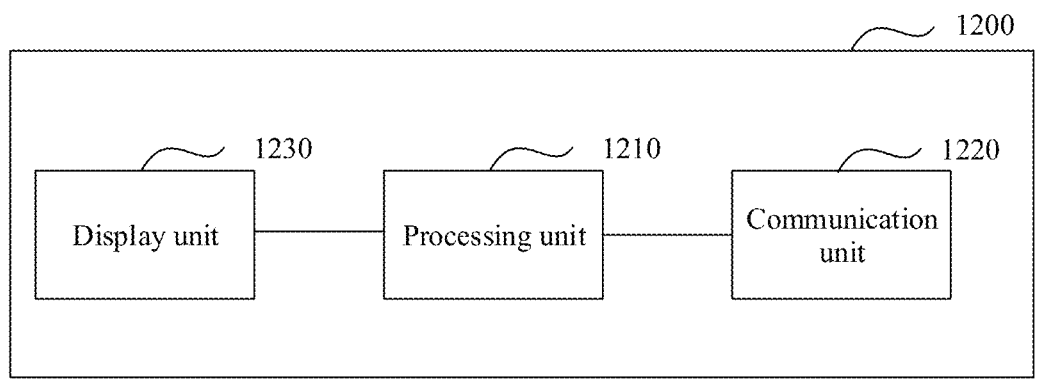
FIG. 12 is a schematic diagram of a structure of a charging progress prediction apparatus according to an embodiment of this application.

FIG. 12 is a structural block diagram of a charging progress prediction apparatus 1200 according to an embodiment of this application. For example, the charging progress prediction apparatus 1200 is, for example, the foregoing mobile terminal or vehicle. The charging progress prediction apparatus 1200 includes a processing unit 1210 and a communication unit 1220.

In an example, the charging progress prediction apparatus 1200 is the foregoing mobile terminal, or an apparatus that can support the mobile terminal in implementing a function required in the method, for example, a chip system. For example, the mobile terminal is a mobile phone.

The processing unit 1210 may be configured to perform all operations, except receiving and sending operations, performed by the mobile terminal in embodiments shown in FIG. 9 to FIG. 11, and/or configured to support another process in the technology described in this specification. The communication unit 1220 may be configured to perform all receiving and sending operations performed by the mobile terminal in embodiments shown in FIG. 2, FIG. 3, and FIG. 8 to FIG. 11, and/or configured to support another process in the technology described in this specification.

The communication unit 1220 may be a function module, and the function module can complete both a sending operation and a receiving operation. For example, the communication unit 1220 is a module included in the charging progress prediction apparatus 1200, and the communication unit 1220 may be configured to perform all sending operations and receiving operations performed by the mobile terminal in embodiments shown in FIG. 2, FIG. 3, and FIG. 8 to FIG. 11. For example, when performing a sending operation, it may be considered that the communication unit 1220 is a sending module, and when performing a receiving operation, it may be considered that the communication unit 1220 is a receiving module. Alternatively, the communication unit 1220 may be a general term of two function modules. The two function modules are respectively a sending module and a receiving module. The sending module is configured to complete a sending operation. For example, the communication unit 1220 is a module included in the mobile terminal, the sending module may be configured to perform all sending operations performed by the mobile terminal in embodiments shown in FIG. 2, FIG. 3, and FIG. 8 to FIG. 11, and the receiving module is configured to complete a receiving operation. For example, the communication unit 1220 is a module included in the mobile terminal, and the receiving module may be configured to perform all receiving operations performed by the mobile terminal in embodiments shown in FIG. 2, FIG. 3, and FIG. 8 to FIG. 11.

In an example, the charging progress prediction apparatus 1200 is the foregoing vehicle, or an apparatus that can support the vehicle in implementing a function required in the method, for example, a chip system. The processing unit 1210 may be configured to perform all operations performed by the vehicle other than vehicle operations in embodiments shown in FIG. 9 to FIG. 11, and/or configured to support another process in the technology described in this specification. The communication unit 1220 may be configured to perform all receiving and sending operations performed by the vehicle in embodiments shown in FIG. 2, FIG. 3, and FIG. 8 to FIG. 11, and/or configured to support another process in the technology described in this specification.

The communication unit 1220 may be a function module, and the function module can complete both a sending operation and a receiving operation. For example, the communication unit 1220 is a module included in the vehicle, and the communication unit 1220 may be configured to perform all sending operations and receiving operations performed by the vehicle in embodiments shown in FIG. 2, FIG. 3, and FIG. 8 to FIG. 11. For example, when performing a sending operation, it may be considered that the communication unit 1220 is a sending module, and when performing a receiving operation, it may be considered that the communication unit 1220 is a receiving module. Alternatively, the communication unit 1220 may be a general term of two function modules. The two function modules are respectively a sending module and a receiving module. The sending module is configured to complete a sending operation. For example, the communication unit 1220 is a module included in the vehicle, the sending module may be configured to perform all sending operations performed by the vehicle in embodiments shown in FIG. 2, FIG. 3, and FIG. 8 to FIG. 11, and the receiving module is configured to complete a receiving operation. For example, the communication unit 1220 is a module included in the vehicle, and the receiving module may be configured to perform all receiving operations performed by the vehicle in embodiments shown in FIG. 2, FIG. 3, and FIG. 8 to FIG. 11.

In an example, the charging progress prediction apparatus 1200 is the foregoing network device, or an apparatus that can support the network device in implementing a function required in the method, for example, a chip system. The processing unit 1210 may be configured to perform all operations, except receiving and sending operations, performed by the network device in embodiments shown in FIG. 2, FIG. 3, and FIG. 8, and/or configured to support another process in the technology described in this specification. The communication unit 1220 may be configured to perform all receiving and sending operations performed by the network device in embodiments shown in FIG. 2, FIG. 3, and FIG. 8, and/or configured to support another process in the technology described in this specification.

The communication unit 1220 may be a function module, and the function module can complete both a sending operation and a receiving operation. For example, the communication unit 1220 is a module included in the network device, and the communication unit 1220 may be configured to perform all sending operations and receiving operations performed by the network device in embodiments shown in FIG. 2, FIG. 3, and FIG. 8. For example, when performing a sending operation, it may be considered that the communication unit 1220 is a sending module, and when performing a receiving operation, it may be considered that the communication unit 1220 is a receiving module. Alternatively, the communication unit 1220 may be a general term of two function modules. The two function modules are respectively a sending module and a receiving module. The sending module is configured to complete a sending operation. For example, the communication unit 1220 is a module included in the network device, the sending module may be configured to perform all sending operations performed by the network device in embodiments shown in FIG. 2, FIG. 3, and FIG. 8, and the receiving module is configured to complete a receiving operation. For example, the communication unit 1220 is a module included in the network device, and the receiving module may be configured to perform all receiving operations performed by the network device in embodiments shown in FIG. 2, FIG. 3, and FIG. 8.

Optionally, the charging progress prediction apparatus 1200 may further include a display unit 1230. The display unit 1230 may be a display screen of a mobile terminal, or may be a central display screen of a vehicle, or the like.

In this embodiment of this application, division into the units is an example, and is merely logical function division. During actual implementation, another division manner may be used. In addition, function units in this embodiment of this application may be integrated into one processor, or each of the units may exist alone physically, or two or more units may be integrated into one unit. The integrated unit may be implemented in a form of hardware, or may be implemented in a form of a software function unit.

Only one or more of the units in FIG. 12 may be implemented by software, hardware, firmware, or a combination thereof. The software or firmware includes but is not limited to computer program instructions or code, and may be executed by a hardware processor. The hardware includes but is not limited to various integrated circuits, for example, a central processing unit (CPU), a digital signal processor (DSP), a field programmable gate array (FPGA), or an application-specific integrated circuit (ASIC).

Figure 13:
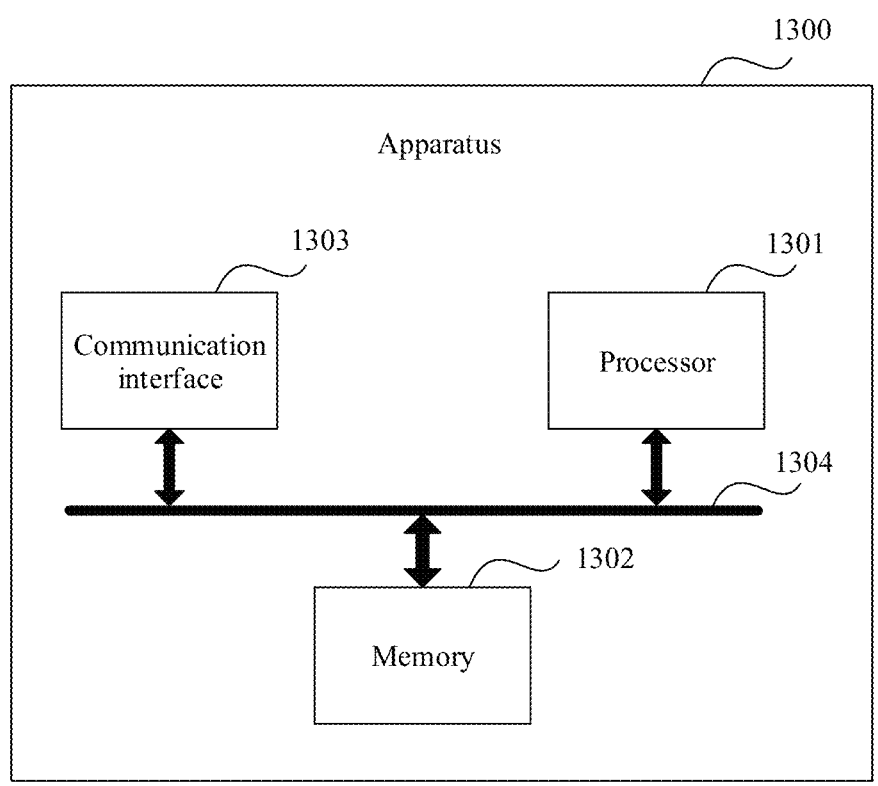
FIG. 13 is a schematic diagram of a structure of another charging progress prediction apparatus according to an embodiment of this application.

FIG. 13 is a schematic diagram of hardware of a charging progress prediction apparatus 1300 according to an embodiment of this application. The charging progress prediction apparatus 1300 includes at least one processor 1301, and further includes at least one memory 1302, configured to store program instructions and/or data. The memory 1302 is coupled to the processor 1301. The coupling in this embodiment of this application is an indirect coupling or a communication connection between apparatuses, units, or modules, may be in an electrical form, a mechanical form, or another form, and is used for information exchange between the apparatuses, the units, or the modules. The processor 1301 may perform an operation cooperatively with the memory 1302. The processor 1301 may execute the program instructions stored in the memory 1302. At least one of the at least one memory 1302 may be included in the processor 1301.

The charging progress prediction apparatus 1300 may further include a communication interface 1303, configured to communicate with another device by using a transmission medium, so that the charging progress prediction apparatus 1300 may communicate with the another device. In this embodiment of this application, the communication interface may be a transceiver, a circuit, a bus, a module, or a communication interface of another type. In this embodiment of this application, when the communication interface is a transceiver, the transceiver may include an independent receiver and an independent transmitter, or may be a transceiver integrated with a transceiver function, an interface circuit, or the like.

It should be understood that connection media between the processor 1301, the memory 1302, and the communication interface 1303 are not limited in this embodiment of this application. In this embodiment of this application, in FIG. 13, the memory 1302, the processor 1301, and the communication interface 1303 are connected through a communication bus 1304. The bus is represented by using a thick line in FIG. 13. A connection manner between other components is merely an example for description, and is not limited. The bus may include an address bus, a data bus, a control bus, and the like. For ease of representation, only one thick line is used to represent the bus in FIG. 13, but this does not mean that there is only one bus, only one type of bus, or the like.

In an example, the charging progress prediction apparatus 1300 is configured to implement the steps performed by the mobile terminal in the procedures shown in FIG. 2, FIG. 3, and FIG. 8 to FIG. 11. The charging progress prediction apparatus 1300 may be the mobile terminal, or a chip or a circuit in the mobile terminal. The communication interface 1303 is configured to perform the receiving and sending operations of the mobile terminal in the foregoing embodiments. The processor 1301 is configured to perform processing-related operations of the mobile terminal in the foregoing method embodiments.

In an example, the charging progress prediction apparatus 1300 is configured to implement the steps performed by the vehicle in the procedures shown in FIG. 2, FIG. 3, and FIG. 8 to FIG. 11. The charging progress prediction apparatus 1300 may be the vehicle, or a chip or a circuit in the vehicle. The communication interface 1303 is configured to perform related receiving and sending operations on a vehicle side in the foregoing embodiments. The processor 1301 is configured to perform processing-related operations on the vehicle side in the foregoing method embodiments.

In an example, the charging progress prediction apparatus 1300 is configured to implement the steps performed by the network device in the procedures shown in FIG. 2, FIG. 3, and FIG. 8. The charging progress prediction apparatus 1300 may be the network device, or a chip or a circuit in the network device. The communication interface 1303 is configured to perform related receiving and sending operations on a network device side in the foregoing embodiment. The processor 1301 is configured to perform processing-related operations on the network device side in the foregoing method embodiments.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor or any conventional processor or the like. The steps of the method disclosed with reference to embodiments of this application may be directly performed by a hardware processor, or may be performed by using a combination of hardware in the processor and a software module.

In embodiments of this application, the memory may be a nonvolatile memory, such as a hard disk drive (hard disk drive, HDD) or a solid-state drive (solid-state drive, SSD), or may be a volatile memory (volatile memory), such as a random-access memory (random-access memory, RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store the program instructions and/or the data.

All or some of the methods in embodiments of this application may be implemented by using software, hardware, firmware, or any combination thereof. When software is used to implement embodiments, all or a part of the embodiments may be implemented in a form of a computer program product. The computer program product includes one or more computer instructions. When the computer program instructions are loaded and executed on a computer, the procedure or functions according to embodiments of the present invention are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD for short)), a semiconductor medium (for example, an SSD), or the like.

It is clearly that, a person skilled in the art can make various modifications and variations to this application without departing from the scope of this application. This application is intended to cover these modifications and variations of this application provided that they fall within the scope of protection defined by the following claims and their equivalent technologies.

In embodiments of this application, "at least one" means one or more, and "a plurality of" means two or more. The term "and/or" describes an association relationship between associated objects and represents that three relationships may exist. For example, A and/or B may represent the following three cases: Only A exists, both A and B exist, and only B exists. A and B each may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can indicate the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

In the several embodiments provided in this application, it should be understood that the disclosed apparatus and method may be implemented in other manners without departing from the scope of this application. For example, the described embodiment is merely an example. For example, division into the modules or units is merely logical function division and may be other division in actual implementation. For example, a plurality of units or components may be combined or integrated into another system, or some features may be ignored or not performed. The units described as separate parts may or may not be physically separate, and parts displayed as units may or may not be physical units, may be located in one position, or may be distributed on a plurality of network units. Some or all the modules may be selected based on actual needs to achieve the objectives of the solutions of embodiments. A person of ordinary skill in the art may understand and implement embodiments without creative efforts.

In addition, the apparatus and method described herein, and schematic diagrams of different embodiments can be combined or integrated with other systems, modules, technologies, or methods without departing from the scope of this application. In addition, the displayed or discussed mutual couplings or direct couplings or communication connections may be implemented through some interfaces. The indirect couplings or communication connections between the apparatuses or units may be implemented in electronic, mechanical, or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A battery charging progress prediction apparatus, comprising:
   at least one processor; and
   a non-transitory computer-readable storage medium including computer-executable instructions executed by the at least one processor to cause the apparatus to:
   receive a request message from a first terminal or a second terminal, wherein the request message comprises a battery model of a battery of the first terminal and a first state of charge (SOC), the first SOC is a start SOC from which the battery of the first terminal is charged, and the first terminal is bound to the second terminal;
   determine charging progress information of the battery of the first terminal based on the request message, wherein the charging progress information is predicted based on a prediction model corresponding to the battery model, wherein the charging progress information comprises at least one of first duration or a second SOC, the first duration is duration for charging from the first SOC to a target SOC, and the second SOC is an SOC reached after charging for target duration from the first SOC; and
   send a response message to the first terminal or the second terminal in response to the request message, wherein the response message comprises the charging progress information.

2. The apparatus according to claim 1, wherein the request message comprises at least one of the target SOC or the target duration.

3. The apparatus according to claim 1, wherein at least one of the target SOC or the target duration is preset.

4. The apparatus according to claim 1, wherein
   wherein the prediction model is used to predict a charging progress of a battery of the battery model, the prediction model is obtained based on charging parameters corresponding to an SOC subinterval, the SOC subinterval is obtained by dividing an SOC interval in historical charging data, the charging parameters comprise a third SOC, a fourth SOC, and second duration, the second duration is duration for charging from the third SOC to the fourth SOC, a start point of the SOC subinterval is the third SOC, an end point of the SOC subinterval is the fourth SOC, the historical charging data is charging data of the battery of the battery model, and the SOC interval is an interval formed by a start SOC and an end SOC of the historical charging data.

5. The apparatus according to claim 4, wherein the computer-executable instructions, when executed by the at least one processor, cause the apparatus to:
use a charging parameter other than the second duration in the charging parameters as an input, and use the second duration as an output, to obtain the prediction model.

6. The apparatus according to claim 5, wherein the computer-executable instructions, when executed by the at least one processor, cause the apparatus:
use a charging parameter other than the fourth SOC in the charging parameters as an input, and use the fourth SOC as an output, to obtain the prediction model.

7. A battery charging progress prediction apparatus, comprising:
at least one processor; and
a non-transitory computer-readable storage medium including computer-executable instructions executed by the at least one processor to cause the apparatus to:
send a first request message to a network device, wherein the first request message comprises a battery model of a battery of a first terminal and a first state of charge (SOC), the first SOC is a start SOC from which the battery of the first terminal is charged, and the first request message is used to request to predict a charging progress of the battery of the first terminal based on a prediction model corresponding to the battery model;
receive a first response message from the network device in response to the first request message, wherein the first response message comprises charging progress information of the battery of the first terminal, the charging progress information comprises at least one of first duration or a second SOC, the first duration is duration for charging from the first SOC to a target SOC, and the second SOC is an SOC reached after charging for target duration from the first SOC; and
display the charging progress information.

8. The apparatus according to claim 7, wherein the computer-executable instructions, when executed by the at least one processor, cause the apparatus to:
send the charging progress information to a second terminal bound to the first terminal.

9. The apparatus according to claim 7, wherein the computer-executable instructions, when executed by the at least one processor, cause the apparatus to:
receive a second request message from a second terminal bound to the first terminal, wherein the second request message is used to request to obtain at least one of the battery model or the first SOC; and
send a second response message to the second terminal, wherein the second response message comprises at least one of the battery model or the first SOC.

10. The apparatus according to claim 7, wherein the send a first request message to a network device comprises:

send the first request message to the network device when detecting that the first terminal is within a preset range of a charging pile.

11. The apparatus according to claim 7, wherein the send a first request message to a network device comprises:
send the first request message to the network device when detecting that the battery of the first terminal is connected to a power supply.

12. The apparatus according to claim 7, wherein the first request message comprises at least one of the target SOC or the target duration.

13. The apparatus according to claim 7, wherein at least one of the target SOC or the target duration is preset.

14. A battery charging progress prediction method, comprising:
sending a first request message to a network device, wherein the first request message comprises a battery model of a battery of a first terminal bound to a second terminal and a first state of charge (SOC), the first SOC is a start SOC from which the battery of the first terminal is charged, and the first request message is used to request to predict a charging progress of the battery of the first terminal based on a prediction model corresponding to the battery model;
receiving a first response message from the network device in response to the first request message, wherein the first response message comprises charging progress information of the battery of the first terminal, the charging progress information comprises at least one of first duration or a second SOC, the first duration is duration for charging from the first SOC to a target SOC, and the second SOC is an SOC reached after charging for target duration from the first SOC; and
displaying the charging progress information.

15. The method according to claim 14, wherein the method further comprises:
sending the charging progress information to the first terminal.

16. The method according to claim 14, wherein the method further comprises:
sending a second request message to the first terminal, wherein the second request message is used to request to obtain at least one of the battery model or the first SOC; and
receiving a second response message from the first terminal, wherein the second response message comprises at least one of the battery model or the first SOC.

17. The method according to claim 14, wherein the sending, by a second terminal, a first request message to a network device comprises:
sending the first request message to the network device when detecting that the first terminal is within a preset range of a charging pile.

18. The method according to claim 14, wherein the sending, by a second terminal, a first request message to a network device comprises:
sending the first request message to the network device when detecting that the battery of the first terminal is connected to a power supply.

19. The method according to claim 14, wherein the first request message comprises at least one of the target SOC or the target duration.

20. The method according to claim 14, wherein at least one of the target SOC or the target duration is preset.

* * * * *